US012010397B2

(12) United States Patent
Marshall et al.

(10) Patent No.: US 12,010,397 B2
(45) Date of Patent: *Jun. 11, 2024

(54) METHOD AND APPARATUS FOR PROVIDING CONTENT METADATA IN ELECTRONIC ADVERTISING

(71) Applicant: Microsoft Technology Licensing, LLC, Redmond, WA (US)

(72) Inventors: Samuel Marshall, New York, NY (US); Sebastien Caubet, Lons (FR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,289

(22) Filed: Nov. 29, 2021

(65) Prior Publication Data
US 2022/0086533 A1    Mar. 17, 2022

Related U.S. Application Data

(63) Continuation of application No. 16/717,263, filed on Dec. 17, 2019, now Pat. No. 11,218,781.

(51) Int. Cl.
H04N 21/81        (2011.01)
G06Q 30/0273      (2023.01)
H04N 21/262       (2011.01)

(52) U.S. Cl.
CPC ....... *H04N 21/812* (2013.01); *G06Q 30/0275* (2013.01); *H04N 21/26258* (2013.01); *H04N 21/26283* (2013.01)

(58) Field of Classification Search
None
See application file for complete search history.

(56) References Cited

U.S. PATENT DOCUMENTS 11,218,781 B2 *  1/2022  Marshall ............ G06Q 30/0275
2012/0084801 A1   4/2012  Rowe et al.
(Continued)

OTHER PUBLICATIONS

Peterson, Tim, 'Hard to figure out the best route': Ad buyers wrestle with how to buy connected TV ads—Digiday, Nov. 25, 2019, pp. 1-5.

*Primary Examiner* — Jefferey F Harold
*Assistant Examiner* — Charles N Hicks
(74) *Attorney, Agent, or Firm* — Calfee, Halter & Griswold LLP

(57) ABSTRACT

Aspects of the subject disclosure may include, for example, receiving a bid request that indicates a television channel associated with a video stream requested by an end user device and that includes ad space information associated with an ad space of the video stream, where the video stream being requested is an Over-The-Top (OTT) streaming service that provides scheduled content. Context information can be accessed according to the television channel and according to a time associated with the ad space, where the context information describes the video stream and is generated by a context server. An auction is performed to obtain bid responses, where the auction provides bidders with context data that is representative of at least a portion of the context information, and where selection of the candidate bid responses enables a determination of a creative for the ad space of the video stream. Other embodiments are disclosed.

20 Claims, 9 Drawing Sheets

(56) References Cited

U.S. PATENT DOCUMENTS

| | | |
|---|---|---|
| 2014/0279056 A1 | 9/2014 | Sullivan et al. |
| 2015/0058138 A1 | 2/2015 | Schler |
| 2017/0098253 A1 | 4/2017 | Box et al. |
| 2017/0099525 A1 | 4/2017 | Ray et al. |
| 2017/0127123 A1 | 5/2017 | Lidow et al. |
| 2019/0261061 A1 | 8/2019 | Liassides et al. |
| 2021/0185407 A1 | 6/2021 | Marshall et al. |

* cited by examiner

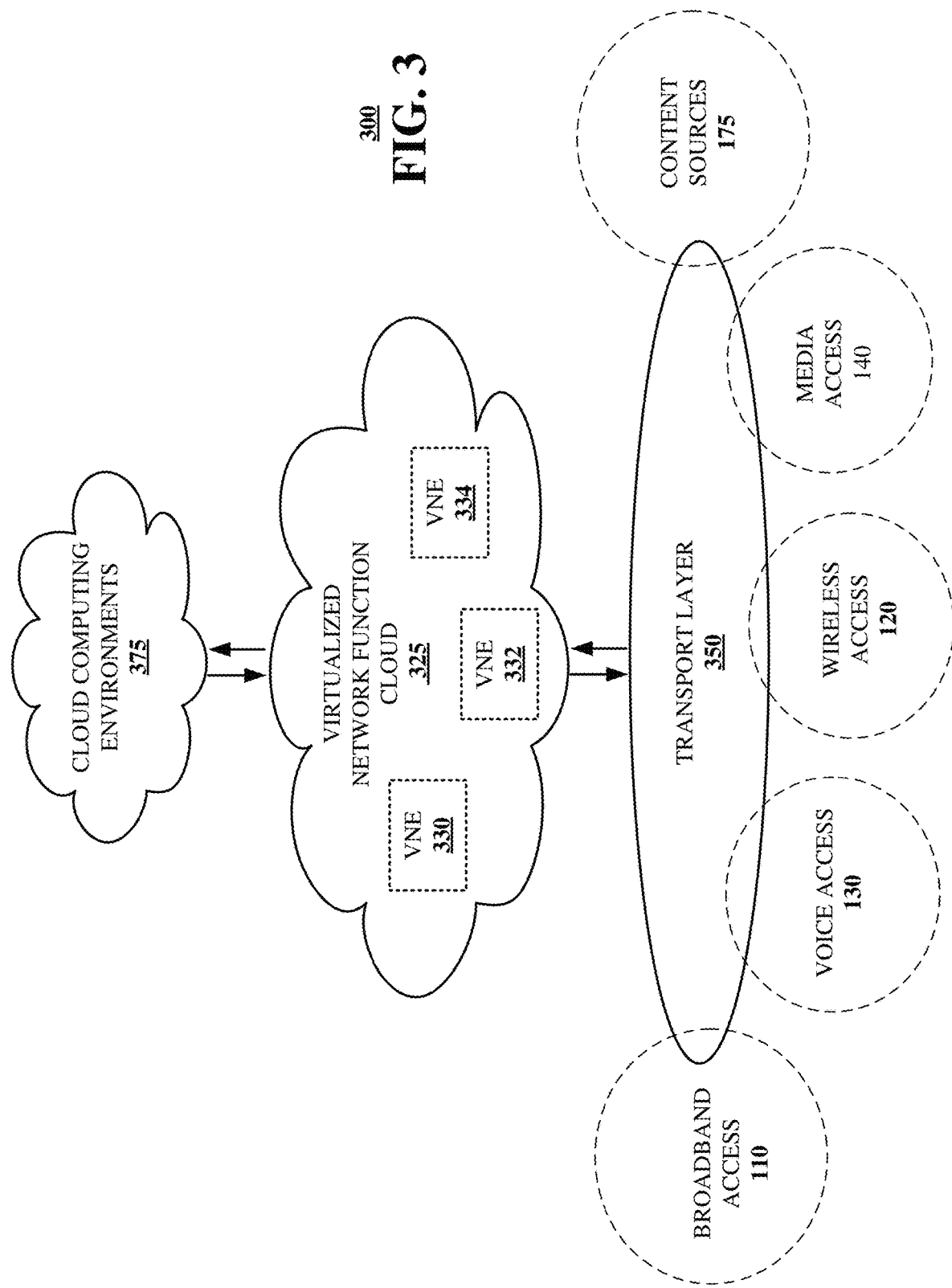

METHOD AND APPARATUS FOR PROVIDING CONTENT METADATA IN ELECTRONIC ADVERTISING

CROSS REFERENCE TO RELATED APPLICATIONS

This application is a continuation of U.S. patent application Ser. No. 16/717,263 filed on Dec. 17, 2019. All sections of the aforementioned application are incorporated herein by reference in their entirety.

FIELD OF THE DISCLOSURE

The subject disclosure relates to a method and apparatus for providing content metadata in electronic advertising.

BACKGROUND

As the habits and behavior of content viewers continue to evolve, advertisers seek to reach their audiences in operationally efficient ways. Digital advertising can be a fragmented and inefficient process depending on the type of media service delivering the content. Publishers desire to increase or maximize the yield efficiency for their ad inventory, while advertisers seek the maximum benefit in ad placement.

Various media services are currently being provided to content viewers by various entities, including virtual Multichannel Video Programming Distributors (vMVPDs) that stream live content over the Internet. For the streaming of live content over the Internet, viewership can vary depending on the particular scheduled content including live events such as sporting events, concerts and the like.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
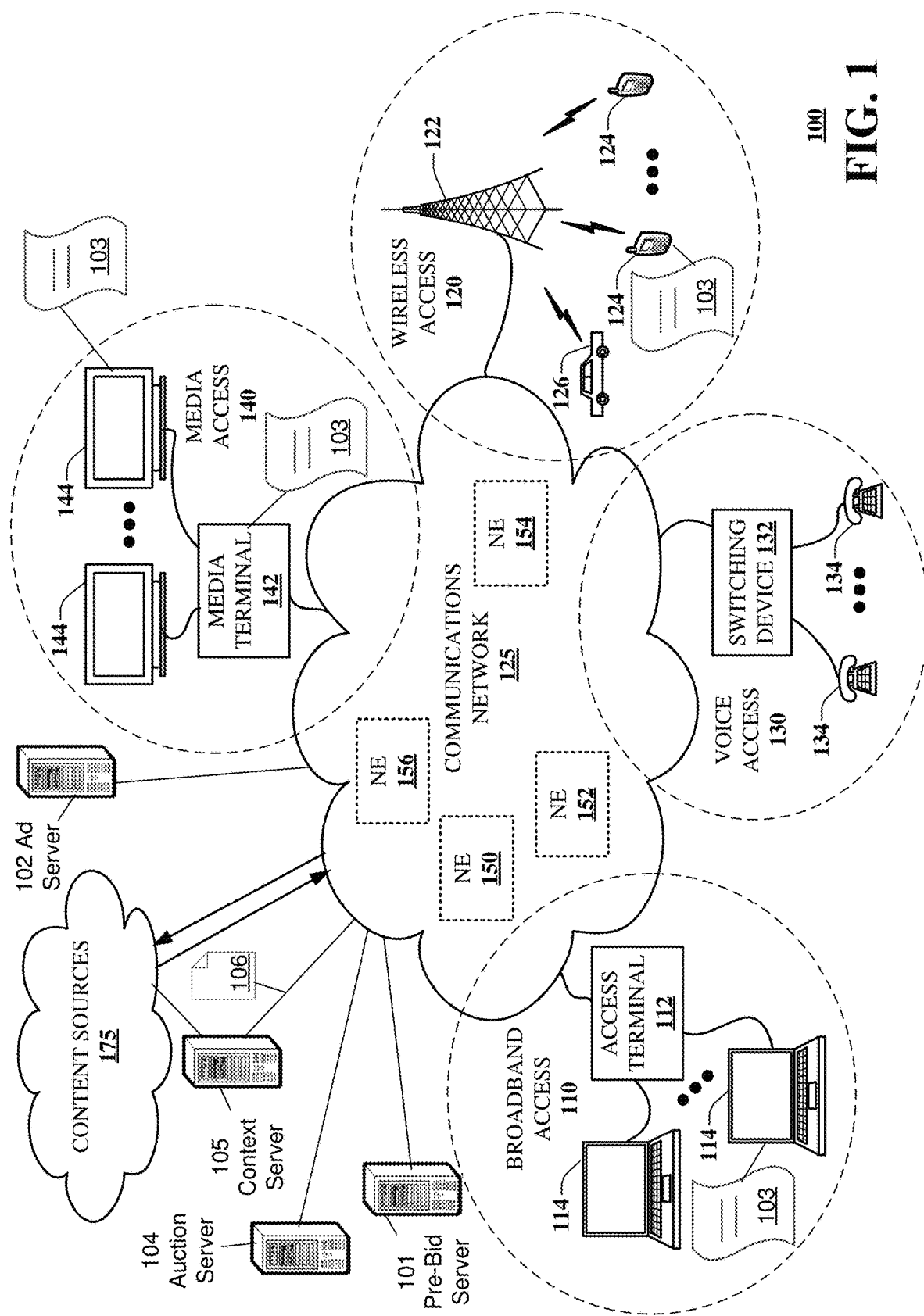
FIG. 1 is a block diagram illustrating an exemplary, non-limiting embodiment of a communications network in accordance with various aspects described herein.

The subject disclosure describes, among other things, illustrative embodiments for managing electronic advertising. The systems and methods described herein can provide additional information to facilitate the buying and selling of ad space for creatives, particularly where publishers are trying to increase or maximize the yield efficiency for their ad inventory, while advertisers are trying to increase or maximize the benefit of their ad placement. In one or more embodiments, advertising auctions can provide bidders with a more detailed description of the content or other dimensions related to the content in which the ad or creative will be placed. This can facilitate decisions by bidders as to bidding on the particular ad space, such as allowing bidders to know that the particular content that includes the ad space is a college football game between teams A and B, as opposed to not knowing the type of content or only knowing that the content is a sporting event. In one or more embodiments, the more detailed description of the content can allow buyers or bidders to avoid ad placement with respect to a particular show, genre and so forth, such as by removing or excluding a show or genre via one or more targeting criteria of a line item or exchange curated deal.

In one or more embodiments, information that is descriptive of the content (e.g., context data) can be provided to bidders during an auction(s). The auction(s) can be of various types including an auction conducted by an ad server and/or a prebid auction (e.g., performed by one or more Supply-Side Platform (SSP) servers). This context data can allow bidders to make more-informed decisions regarding the ad placement including providing bid prices to more accurately reflect the value of the ad space. For example, higher bid prices can be provided and/or expected for content that is expected to have a higher viewership, such as a playoff basketball game as opposed to a regular season basketball game. In one or more embodiments, the use of context data in auctions can enable monetizing different content (that has different viewership) at rates (and/or utilizing pricing techniques) similar to linear television.

In one or more embodiments, publishers that are providing content via vMPVDs can utilize programmatic solutions in their advertising business. In one or more embodiments, the publishers can more effectively describe and sell the live content (e.g., scheduled sporting events, news programs, and/or other scheduled programming including television shows) in an ad auction, which can include prebid auctions. These examples enable highly viewed, recognized, and/or professionally-produced content to be distinctly sold (e.g., at higher prices) as opposed to being sold alongside long-tail video inventory.

In one or more embodiments, Programmatic Over-The-Top (OTT) with Prebid (POP) video ad insertion can be implemented which allows for providing a description of the content to the bidder and which also enables adherence to various policies including revenue yield and so forth. One or more of the exemplary embodiments provide a POP video ad insertion process that can be utilized during live streaming of scheduled content (e.g., sporting events, news, scheduled programming, and so forth) based on context data derived from a context server, such as Electronic Programming Guide (EPG) data from an EPG service or server. For instance, the EPG data can identify one or more of content duration, genre, program type, rating, a more detailed description of content such as a summary of an episode, and so forth. In one or more embodiments, the particular channel being requested by the end user device for the live streaming service and a time associated with the service (e.g., a time of an ad request or a time that the scheduled content is being presented at the end user device) can be utilized (e.g., via indexing or mapping) to determine the applicable EPG data for the particular scheduled content that includes the particular ad space. The ad request or ad call can include various information that is utilized in the buying and selling process for the ad insertion such as location information, video player type, formats supported, channel indicia, time indicia, and so forth.

In one or more embodiments, the EPG data can be retrieved from an EPG service or server at a particular frequency, such as daily, and stored locally, such as at a prebid server, an ad exchange server, or other storage device. In one or more embodiments, the EPG data corresponding to the particular live content for which an ad space is available can be filtered or otherwise adjusted so that only particular context data is provided to the bidders during the auction. In one or more embodiments, the filtered context data can be generated at a granularity or level of detail that adheres to a particular agreement, such as an agreement among the distributor, publisher and/or other entity. In one or more embodiments, the particular agreement can be analyzed (e.g., via pattern recognition, machine learning, and so forth) to determine filtering criteria that can be applied to the EPG data, such that the resulting filtered context data (to be shared with some or all of the bidders or potential buyers) is generated at the agreed upon granularity or level of detail.

In one or more embodiments, a standardized technique can be utilized for passing content descriptive data, such as live content metadata, to buyers and bidders rather than requiring a particular publisher or other entity to manually insert and pass the information. In one or more embodiments, custom descriptive data (e.g., utilized by the particular publisher) that labels content can be translated or otherwise adjusted into a standardized form that is recognizable to the buyers and bidders. In one or more embodiments, a standardized form of description of the content can allow buyers or bidders to target and/or avoid ad placement with respect to a particular show, genre and so forth, such as through use of one or more targeting criteria of a line item or exchange curated deal and/or through use of one or more exclusion criteria of a line item or exchange curated deal.

One or more of the exemplary embodiments can provide an ad insertion platform that allows for managing ad insertion in various media types including OTT live content, as well as other media types such as web pages, linear television, OTT video-on-demand, and so forth. For example, a POP video ad insertion process can be used with OTT live content that offers compliance and control comparable with other media services (e.g., TV ad placement) while supporting simultaneous competition for inventory by programmatic demand. One or more of the exemplary embodiments provide for convergence of direct-sold and programmatic campaigns and an increase of maximization of the value of inventory. In one or more embodiments, publishers can pre-agree with, and execute on, reserved delivery commitments with programmatic buyers without compromising control over how their inventory is monetized. Other embodiments are described in the subject disclosure.

One or more aspects of the subject disclosure include a server having a processing system with a processor. The server has a memory that stores executable instructions that, when executed by the processing system, facilitate performance of operations. The server can receive a bid request that indicates a television channel associated with a video stream requested by an end user device and that includes ad pod information associated with an ad pod of the video stream, where the video stream is requested as an OTT live streaming service that provides scheduled content. The server can access context information according to the television channel and according to a time associated with the ad pod, where the context information describes the video stream and is generated by a context server. The server can perform an auction to obtain bid responses, where the auction provides bidders with context data that is representative of at least a portion of the context information. Each of the bid responses can include a price. Candidate bid responses can be selected from among the bid responses according to the price of each of the bid responses. Selection of the candidate bid responses enables a determination of an ad play list for the ad pod of the video stream according to business rules. The business rules can include a yield policy that is enforced based on the price for each of the candidate bid responses. The yield policy can be based on increasing revenue for a publisher of the video stream.

One or more aspects of the subject disclosure include a machine-readable medium, comprising executable instructions that, when executed by a processing system including a processor, facilitate performance of operations. The processing system can receive a bid request that indicates a television channel associated with a video stream requested by an end user device and that includes ad space information associated with an ad space of the video stream, where the video stream is requested as an OTT live streaming service that provides scheduled content. The processing system can access context information according to the television channel and according to a time associated with the ad space, where the context information describes the video stream and is generated by a context server. An auction can be performed to obtain bid responses, where the auction provides bidders with context data that is representative of at least a portion of the context information, and where each of the bid responses includes a price. Candidate bid responses are selected from among the bid responses according to the price of each of the bid responses, where selection of the candidate bid responses enables a determination of a creative for the ad space of the video stream, and where the context information comprises EPG Data.

One or more aspects of the subject disclosure include a method in which a processing system (including a processor) can receive, over a network from a Server-Side Ad Insertion (SSAI) server, an ad request associated with an ad space of a video stream requested by an end user device, where the video stream is requested as an OTT live streaming service that provides scheduled content. The processing system can transmit, over the network, bid requests to a plurality of SSP servers including a first SSP server. The bid requests can be based on the ad request. A first bid request of the bid requests received by the first SSP server can indicate a television channel associated with the video stream of the scheduled content. The first SSP server, according to the television channel and a time associated with the ad request, can access context information that is generated by a context server. The context information can describe the scheduled content, where context data representative of at least a portion of the context information is provided to bidders in a prebid auction performed by the first SSP server. The processing system can receive, over the network within a time deadline, bid responses from one or more of the plurality of SSP servers, where each of the bid responses includes a price. The processing system can select candidate bid responses from among the bid responses according to the price of each of the bid responses. The processing system can transmit, over the network to the SSAI server, key values representative of the price for each of the candidate bid responses, where the transmitting of the key values enables the SSAI server to provide key value information representative of the price for each of the candidate bid responses to an ad server. Providing the key value information to the ad server enables the ad server to determine a creative for the ad space of the video stream. The SSAI server stitches the scheduled content of the video stream with the creative resulting in stitched content provided to the end user device.

Referring now to FIG. 1, a block diagram is shown illustrating an example, non-limiting embodiment of a communications network or system 100 in accordance with various aspects described herein. For example, the communications system 100 can facilitate in whole or in part managing advertising insertion in various media services including in OTT services (e.g., live content) such as rendered by a mobile phone, a laptop computer, a smart television, a gaming console, an application executing on a set top box, a vehicle entertainment system, or any end user device operating in system 100. The advertising insertion can utilize various buying and selling techniques including one or more of guaranteed buys (e.g., according to offline agreement with buyers), direct auctions (e.g., auction being conducted by an ad server), prebidding (e.g., auctions being conducted by demand partners), SSP or seller deals, and/or curated deals (e.g., where a broker aggregates inventory across multiple sellers and offers that up to buyer(s)). Examples of deals, curated deals and how they can be implemented, which can be used in conjunction with the features described herein, are described in U.S. patent application Ser. No. 16/717,243 filed Dec. 17, 2019 entitled "Method and Apparatus for Managing Broker Curated Deals in Electronic Advertising", the disclosure of which is hereby incorporated by reference herein.

One or more of the exemplary embodiments can provide POP video ad insertion, such as into an ad space or an ad pod, through use of a prebid server 101, ad server 102, a prebid client-side code or script (e.g., javascript) 103, an auction server 104 and/or a context server 105. As described herein, POP ad insertion according to the exemplary embodiments can provide the desired efficiency that comes with programmatic demand to video publishers (including OTT live content) while providing bidders with context information describing the content (e.g., in a standardized fashion) to allow for more-informed bidding decisions. In one or more embodiments, the context information can allow buyers or bidders to target and/or avoid ad placement with respect to a particular show, genre and so forth, such as through use of one or more targeting criteria of a line item or exchange curated deal and/or through use of one or more exclusion criteria of a line item or exchange curated deal. In one or more embodiments, the various POP ad insertion techniques can be utilized in conjunction with techniques for enforcing business rules that maintain control and brand safety to comply with brand requirements, as described in U.S. patent application Ser. No. 16/560,666 filed Sep. 4, 2019 entitled "Content Management in Over-The-Top Services", the disclosure of which is hereby incorporated by reference herein.

System 100 enables buyers or bidders to be provided with context data describing content in which an ad space (e.g., an ad pod) is available. The context data can be derived from a context source such as the context server 105. In one embodiment, the context data can be provided as a standardized description that is available across all types of live content independent of the publisher of the live content. For example, the context source can be an EPG server or service operated by an entity which is distinct from the publisher. In one embodiment, identifying information associated with the scheduled content (e.g., a channel of the content and a time parameter such as of the ad space or ad request) can be utilized to obtain the context information. In one embodiment, the context information can be generated by the entity that is managing the auction or otherwise providing bidding information to the bidders. In another embodiment, the context information can be from multiple sources which can be third party sources (e.g., one or more of Gracenote, IMDb, TMS, and so forth) and/or an internal source (e.g., manager of the auction).

In one or more embodiments, the context source for the context information associated with the scheduled content can be a single source or multiple sources. In one embodiment, multiple sources can be utilized which provide the same type of context information, such as collecting sets of EPG data from multiple sources. In other embodiments, the multiple sources can provide different types of context information, such as collecting genre descriptions from a first source, detailed subject matter descriptions from a second source, and/or actor/actress identifications from a third source. In one embodiment, multiple sources can be utilized where the context information obtained from the multiple sources is aggregated to provide a more detailed description. In one embodiment, multiple sources can be utilized where the context information from the multiple sources for the scheduled content is cross-referenced for accuracy. In one embodiment, multiple sources can be utilized where context information is limited to particular sources for particular scheduled content and obtained from the particular sources to enable aggregation to provide a description as to scheduled content across different content sources. In one embodiment, the context information for scheduled content can include additional information in conjunction with a subject matter description, such as related content, expected viewership data, and so forth. The above examples are described with respect to scheduled content being delivered in an OTT live streaming service, however, context information can be provided for other types of content (e.g., VOD content) utilizing other techniques including identifying the content based on analyzing information associated with the video stream and/or information included in the video stream and obtaining the context information according to the identifying.

In one embodiment, context data obtained from a source (e.g., an EPG service) can be translated into a standardized format that is recognizable by buyers and bidders when describing the particular content that includes the ad space. For instance, the context data can be retrieved from different sources and then aggregated to provide a more robust description of the content, such as OTT live streaming scheduled content. One or more of the exemplary embodiments can pass EPG data and/or can pass other data that describes or is otherwise related to the content (e.g., descriptions, demographic predictions of potential viewers, ratings, popularity information) which can be derived, stored or otherwise managed separately from user-based information (e.g., demographics on the user of the OTT live streaming service).

In one example in an OTT live streaming scenario, the context server 105 can provide context information 106 to one or more of the auction server 104, the prebid server 101 and/or the ad server 102. The context information can be retrieved periodically (e.g., daily) or based on other scheduling or other criteria. As described herein, the context server 105 can be an EPG server, although any source(s) of context information can be utilized in system 100. The context information 106 or a portion thereof can be provided to some or all of the buyers or bidders so that: sellers (e.g., video publishers) can better describe and distinguish their unique content (e.g., scheduled content being delivered in an OTT live streaming service); marketers can gain the ability to forecast, target and/or report on the corresponding attributes; and buyers or bidders can make a more-informed decision regarding the ad insertion (e.g., for a particularly targeted scheduled content being delivered via the OTT service or to avoid a particular scheduled content such as content in an undesired genre). As an example, identifying parameters can be utilized to map or index the particular ad space with the particular scheduled content and its corresponding context information. For instance, a channel and a time parameter (e.g., time stamp associated with the ad request) can be utilized to select the corresponding context information, which may be stored locally by the auction server 104 (and/or the prebid server 101 and/or the ad server 102).

As another example, the context information 106 can be filtered or otherwise adjusted to generate context data according to an agreement(s) (e.g., distributor agreement) that controls the level of granularity that is permitted when describing content. For instance, an agreement or other policy might permit identifying a genre and actors but prohibit providing a subject matter description. Similarly, an agreement or other policy might permit identifying a type of sporting event but prohibit identifying the teams that are playing. The context data can then be provided to the buyers or bidders, such as providing the context data during a prebid auction conducted by the auction server 104 as requested by the prebid server 101.

In one or more embodiments, granularity enforcement can be performed via agreement analysis by the auction server 104 (and/or the prebid server 101 and/or the ad server 102). For example, agreements can be parsed and analyzed through various techniques including image recognition, machine learning, and so forth such that requirements of the agreements can be satisfied during the providing of the context data to the buyers or bidders. This can be performed by various devices, including a policy or analysis engine. For instance, the content identification information, such as a channel identifier and a time stamp, can be utilized via a mapping or indexing process to determine the particular content, as well as to determine the requirements of any agreement associated with describing the particular content. In other embodiments, the content identification information can be other information that allows for determining or otherwise selecting context information that describes the content being presented including ID numbers and so forth.

In other embodiments, the context information can be utilized for various types of buying/selling techniques and/or for various types of media services. In one embodiment, system 100 can facilitate in whole or in part offering curated deals for electronic advertising (such as in an ad space in a live streaming video) where a broker aggregates inventory across multiple sellers and offers that up to buyers. These curated deals can be done utilizing the context information to enable buyers to make a more-informed decision. The curated deals can be done alone or in conjunction with other selling techniques including direct sell, open exchange and/or private marketplace techniques. For instance, an ad call, which is associated with an ad space available in media content that is being presented as OTT live streaming at an end user device, can cause an identification or determination of potential buyers or bidders by a computing system and can cause a determination of context information associated with the media content (such as derived from EPG data that is selected based on a channel identifier and a time parameter indicated in the ad call). This process can be performed by the computing system in a number of different ways including based on an analysis of deal profiles, various line items including creative or buyer line items, seller deals, and/or curated deals. For instance, the creative line items can be associated with buyers, the seller deals can be associated with a seller offering preferential terms to a buyer(s), and/or the curated deals can be associated with brokers that are aggregating inventory of more than one seller which can include third party entities (e.g., distinct from the buyers and the seller). In one or more embodiments, the various information or parameters representative of seller deals, curated deals and so forth can be organized and managed in a number of different ways including through the use of line items that are generated by various parties including sellers, brokers and/or buyers, such as via an interface to the system. In one or more embodiments, the context information can allow buyers or bidders to target and/or avoid ad placement with respect to a particular show, genre and so forth, such as through use of one or more targeting criteria of a line item or exchange curated deal and/or through use of one or more exclusion criteria of a line item or exchange curated deal.

In one embodiment, auctions can be conducted by the computing system with a group of bidders (e.g., bidders that have agreed to or otherwise are configured to engage in curated deals), where the auctions include a curated deal auction in which a broker of the brokers aggregates curated deal inventory across a plurality of sellers including the seller, and where the curated deal inventory includes the ad space. Context information describing the content can be provided to bidders to facilitate the auction. The context information can be obtained in various ways as described herein, including based on EPG data. Bids can be obtained from the auctions and a winning bid can be determined from among the bids by the computing system. A notification associated with the winning bid can then be transmitted by the computing system, where the notification causes the end user device to render a creative associated with the winning bid in the ad space. The computing system can be various devices or combinations of devices including auction server 104 which can be in communication with the communications network 125. FIG. 1 illustrates an ad server 102 in communication with the communications network 125, where the ad server can facilitate the process, including delivering of a particular creative of the winning bidder to the end user device presenting the media content which includes the ad space that is being sold. FIG. 1 further illustrates a prebid server 101 in communication with the communications network 125, where the prebid server can facilitate the process, including initiating one or more auctions with demand partners (e.g., an exchange for prebidding that is being hosted by the auction server 104). One, some or all of the functions described herein can be performed by the prebid server 101, the ad server 102, the auction server 104, another server not shown, or any combination thereof, including in a virtual computing device or a distributed processing environment. One, some or all of the functions described herein can also be performed in a client-side implementation (e.g., utilizing a script executed by the end user device, ad server 102, or any combination thereof) and/or a server-side implementation (e.g., via prebid server 101, ad server 102, auction server 104, another server not shown, or any combination thereof). In one or more embodiments, a Client-Side Ad Insertion (CSAI) implementation for managing digital advertising can be utilized via a code or script 103 (e.g. a javascript) operating on or otherwise being executed by an end user device that will be rendering the content and ad space. The script 103 can perform various functions including one or more of context information retrieving, prebidding, ad insertion, communicating with various devices (e.g., ad server 102 and/or auction server 104) and so forth. In this example, the script 103 can be utilized in conjunction with one or more of the functions described herein where curated deals are analyzed to determine winning bidders.

In one or more embodiments, system 100 can utilize prebidding which can include advance bidding or header bidding. The electronic advertising platform can be employed in various media services. In web page examples, when the page loads, header bidding enables publishers to have simultaneous or overlapping in time auctions with all or selected SSPs (which can include ad exchanges). For OTT examples (such as long form video with ad pods, episodes of programs, movies, live or scheduled content, and so forth), prebidding enables publishers to have simultaneous or overlapping in time auctions with all or selected SSPs (including ad exchanges). One, some, or all of these SSPs can be provided with or can otherwise obtain standardized context data to be delivered to some or all of the bidders. The context data for each of the SSPs that are provided access thereto, can be sourced from the same source(s) or from different sources. Publishers can receive bids on their inventory (e.g., ad space in an ad pod) that may be unavailable through their primary ad server and exchange. The returned bids can then be passed into the ad server 102 so they can compete with direct demand and the primary ad server's exchange (e.g., guaranteed buys according to offline agreement with buyers and direct auction bids for auction being conducted by the ad server 102).

Depending on whether a server-side or client-side implementation is to be utilized, the prebid server 101 or the prebid script 103 can communicate with various equipment including SSPs (e.g., ad auction server 104) and the ad server 102 for enabling POP ad insertion in an ad pod of an OTT video stream (e.g., live content), which can include simultaneous or overlapping-in-time prebid auctions, which can in some instances be used in conjunction with direct bids or guaranteed buys. In one or more embodiments, the prebid server 101 can communicate with an SSAI server (not shown) to facilitate the POP ad insertion technique.

In one embodiment, the prebid server 101 or the prebid script 103 can conduct auctions with multiple selected SSPs (e.g., auction server 104 and including ad exchanges) to collect and determine candidate bids and to store these bids and/or the corresponding creatives (or information enabling access to the creative) in a prebid cache (not shown). In one embodiment, the prebid server 101 or the prebid script 103 can obtain category or brand identification for the creatives of the bids (e.g., included by the bidder in the bid response of the prebid auction) and then can provide key value pairs to the ad server 102 (directly or via an SSAI server), such as price, category, and duration information. The ad server 102 can compare the key values to stored line items to find a matching line item and also to compare to other line items that bid on the ad pod/impression(s).

In one or more embodiments, the process described herein enables the ad server 102 to enforce business rules including yield optimization to increase or optimize revenue and/or competitive separation to prevent competing creatives from appearing in the same ad pod or next to each other in an ad pod, such as in live streaming of scheduled content or long form video. Based on application of the business rules, the ad server 102 can determine the ad play list for the ad pod, such as in an OTT live streaming service. In one embodiment, the selected creatives can then be rendered by the video player during the particular ad pod. In one embodiment, the creatives can be sourced from a prebid cache (e.g., where a prebid winner is selected by the ad server 102) and/or by the ad server 102 (e.g., where a direct or guaranteed bid winner is selected by the ad server). In one embodiment, the ad pod can be populated such as through stitching with content by the SSAI server (not shown) in the SSAI implementation or via a player Software Development Kit (SDK) (not shown) in the CSAI implementation.

In one or more embodiments, the ad server 102 can utilize line items for determining winning bids among the prebids, the direct bids and the guaranteed buys. Line items in conjunction with business and/or prioritization rules can enable agreements (e.g., between the publisher and the bidder) to be implemented and enforced (e.g., by an allocation management module executing on the ad server 102 of the publisher), although in other embodiments the allocation management or enforcement of the business rules can be performed by a separate server in communication with the ad server. In one embodiment, the line items can be utilized in conjunction with the context data to facilitate targeting particular scheduled content that is being delivered via an OTT live streaming session, such as line items that identify particular standardized descriptions of the scheduled content (e.g., targeting particular sports teams, particular sporting events, particular episodes of a scheduled show, and so forth). In one embodiment, the level of the detail of the context data and the level of the detail of the line items can vary, such as describing genres, describing teams in a sporting event, and so forth. In one embodiment, when a request to fill an available ad slot is received, the ad server 102 can compare the characteristics of the ad slot to the parameters of line items representing the publisher's agreements with buyers. If more than one line item matches the ad request (indicating that more than one creative or ad campaign may be eligible to fill the ad slot), the allocation management module can apply business rules (e.g., prioritization rules) to determine which ad campaign or creative fills the ad slot. The business rules can also be applied by the ad server 102 (e.g., in OTT live streaming) for populating ad space or ad pods to enforce a revenue yield policy enforced (e.g., maximized or increased), and or to enforce one or both of a competitive separation and brand safety rules (e.g., preventing competitive creatives from appearing in the same ad pod (or adjacent in an ad pod) and/or preventing a creative from appearing in undesired content or in an ad pod with undesired creative(s)).

In one embodiment, the brand category of the bid can be translated, such as by the prebid server 101 or the prebid script 103 to a corresponding brand category used by the ad server 102 of the publisher. This translated brand category can then be used in a bid caching process, as well as targeting keys that are transmitted to the ad server 102 for determining winning bids utilizing line items. In one or more embodiments, publishers can provide a mapping file accessible to the prebid server 101 or the prebid script 103 that enables converting Interactive Advertising Bureau (IAB)

categories and/or subcategories to the particular labels utilized by their ad server 102. In another embodiment, the prebid server 101 or the prebid script 103 can translate first labels (brands or brand categories) utilized by the bidder to second labels utilized by the ad server 102, which may or may not include translating from the first labels to the IAB categories and then to the second labels. In one or more embodiments, labels can be added to the line items accessible to the ad server 102 to indicate which industries, categories and/or brands will be included in the competitive exclusion. In one or more embodiments, publisher-provided parameters are combined with key values determined from the bid responses to build a video ad tag Uniform Resource Locator (URL) that can be used by a video player.

In one or more embodiments, line items can be created that target prebid key values. In one embodiment, the ad server 102 can include a console or interface that enables inputting objects or specifics in a line item as to what is to be delivered. For instance, the objects or data in the line item can specify particular key values that are being sought. In one embodiment, there can be a link with the line item or the object for a particular creative. In one embodiment, a Video Ad Serving Template (VAST) creative URL is generated that adheres to a particular format which includes the key value(s) passed to the ad server 102 from the prebid script 103 or from the prebid server 101 (via an SSAI server).

The communications network 125 provides broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The exemplary embodiments described herein can provide context data to some or all of the buyers or bidders to facilitate the buying and selling of the ad space, such as in an OTT streaming service that provides scheduled content. The context data can be utilized in a number of different ways utilizing various devices. Examples of buying and selling techniques and devices for ad insertion, which can be used in conjunction with the features described herein, are described in U.S. patent application Ser. No. 16/560,666 filed Sep. 4, 2019 and in U.S. patent application Ser. No. 16/717,243 filed Dec. 17, 2019 entitled "Method and Apparatus for Managing Broker Curated Deals in Electronic Advertising".

Figure 2A:
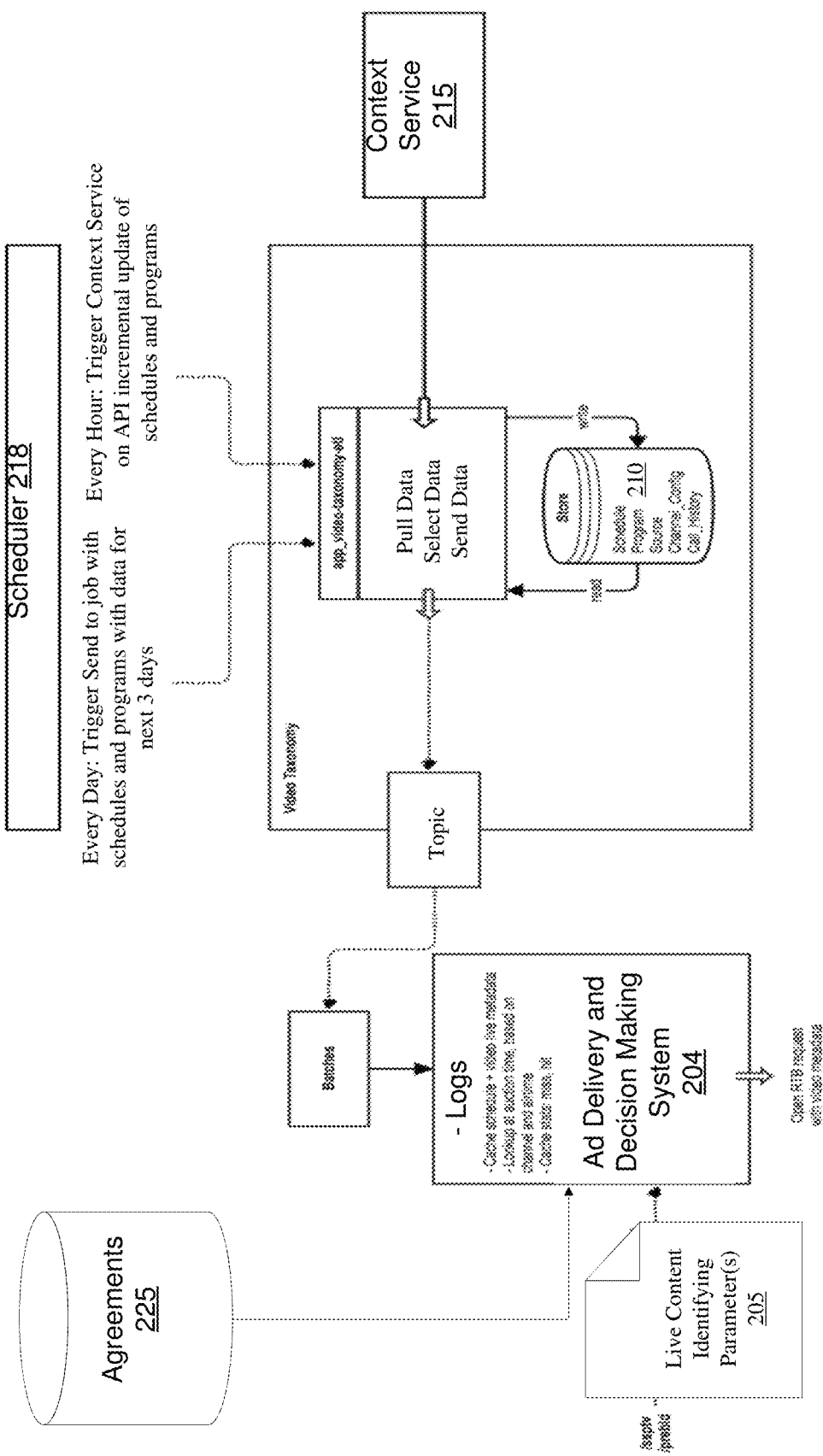
FIG. 2A is a block diagram illustrating an example, non-limiting embodiment of a data flow occurring within or in conjunction with the communication network of FIG. 1 in accordance with various aspects described herein.

FIG. 2A is a block diagram illustrating an example, non-limiting embodiment of data flow 200 associated with obtaining context data for advertising insertion for OTT streaming of scheduled content (e.g., live sports, concerts, news, TV shows). Data flow 200 can result from the exemplary embodiments described herein including system 100. Data flow 200 is shown with respect to an Ad Delivery and Decision Making system 204 that can provide bid requests (e.g., open RTB request with video data) to obtain bids for an ad insertion into the scheduled content that is being streamed via the OTT service to an end user device (not shown). For example, the system 204 can perform functions described with respect to the Ad Delivery and Decisioning system of U.S. patent application Ser. No. 16/717,243 filed Dec. 17, 2019 entitled "Method and Apparatus for Managing Broker Curated Deals in Electronic Advertising" (reference 220 in the 6-0086A patent application) including managing seller deals and/or managing broker curated deals (e.g., curated deals that aggregate curated deal inventory across a plurality of sellers where the broker is a distinct entity from the buyers and/or sellers). However, data flow 200 can apply to other devices or functions that are described herein including the prebid server 101, the ad server 102, the prebid client-side code or script 103, and/or the auction server 104.

A context service 215 (which can be a single source or multiple sources) can be utilized for supplying context information corresponding to particular scheduled content that is available via OTT live streaming services. In one embodiment, the context service 215 can utilize an API to provide various context information including data indicating or otherwise describing schedules, programs, sources, and so forth. The retrieving of the context information can be done in a number of different ways, such as utilizing a scheduler 218 which can trigger incremental updates of the retrieved data and can trigger scheduled transmissions of select data. For example, every hour or some other time period, the context service 215 via the API can provide incremental updates of the context information or a portion thereof which can be stored in the storage device 210. Continuing with this example, every day or some other time period context information (e.g., over a particular time range such as three days) can be sent to the system 204 for use in describing the scheduled content during the buying and selling process (e.g., to be provide to bidders in a direct or prebid auction). In one embodiment, the scheduler 218 can initiate retrieval of EPG data that is organized by channel indicia such as a station identifier (e.g., programming service ID or prgSvcId) and time parameter (e.g., UTC datetime).

In one embodiment, particular data in the storage device 210 can be selected for delivery to the system 204 which can then access this data when needed to describe a particular scheduled content such as during a prebid auction (e.g., according to a station identifier and time parameter included in an ad request). For example, the particular data that is readily available to the system 204 can be based on data type such as providing one or more of a genre description (e.g., Talk, News, Politics, Sports talk, Entertainment, Auto racing, Baseball, Basketball, and so forth), a type description (e.g., Show, Episode, Sports, Movie, and so forth), and/or a rating description (e.g., rating according to Motion Picture Association). In another embodiment, the system 204 can retrieve the corresponding context information directly from the storage device 210, such as based on a station identifier and time parameter included in an ad request. In one or more embodiments, the system 204 can generate logs that record various information associated with the ad insertion process for a particular ad request. For example, the logs can track bid information including winning bid information such as one or more of buyer, seller, broker, creative, domain, deals IDs for managed deals and/or curated deals, context data provided to bidders, and so forth. In one or more embodiments, the context information provided to buyers or bidders allows for targeting and/or avoiding ad placement with respect to a particular show, genre and so forth, such as through use of one or more targeting criteria of a line item or exchange curated deal and/or through use of one or more exclusion criteria of a line item or exchange curated deal.

In one embodiment, the system 204 can have access to agreements (e.g., contracts, policies, and so forth) associated with requirements for describing scheduled content, which is shown in FIG. 2A as storage device 225 but can also be part of storage device 210.

As described herein, the agreements can be utilized such that the context information from storage device 210 is filtered or otherwise adjusted prior to being provided to the buyers or bidders to generate context data according to requirements for the level of granularity that is permitted when describing content. As another example, agreements can be parsed and analyzed through various techniques including image recognition, machine learning, and so forth such that requirements of the agreements can be satisfied during the providing of the context data to the buyers or bidders. For instance, the content identification information, such as a channel identifier and/or a time stamp, can be utilized via a mapping or indexing process to determine the particular content and/or to determine the particular agreement that applies to the particular content.

In one embodiment, in order to assign content metadata to live content, a publisher can pass an identifier parameter(s) 205, such as channel_name (e.g., &channel_name=TNT). In another embodiment, where live content can be delayed (e.g., due to pausing of a stream), the publisher can also pass an airtime parameter as the identifying parameter 205 to share the original airtime of the live content. In one embodiment where the airtime parameter is not passed then the airtime can be based on the time of the impression. In these example, the parameters can be included in an ad request in order to facilitate selecting corresponding context information. These parameters may or may not be recorded downstream for reporting or targeting purposes.

Figure 2B:
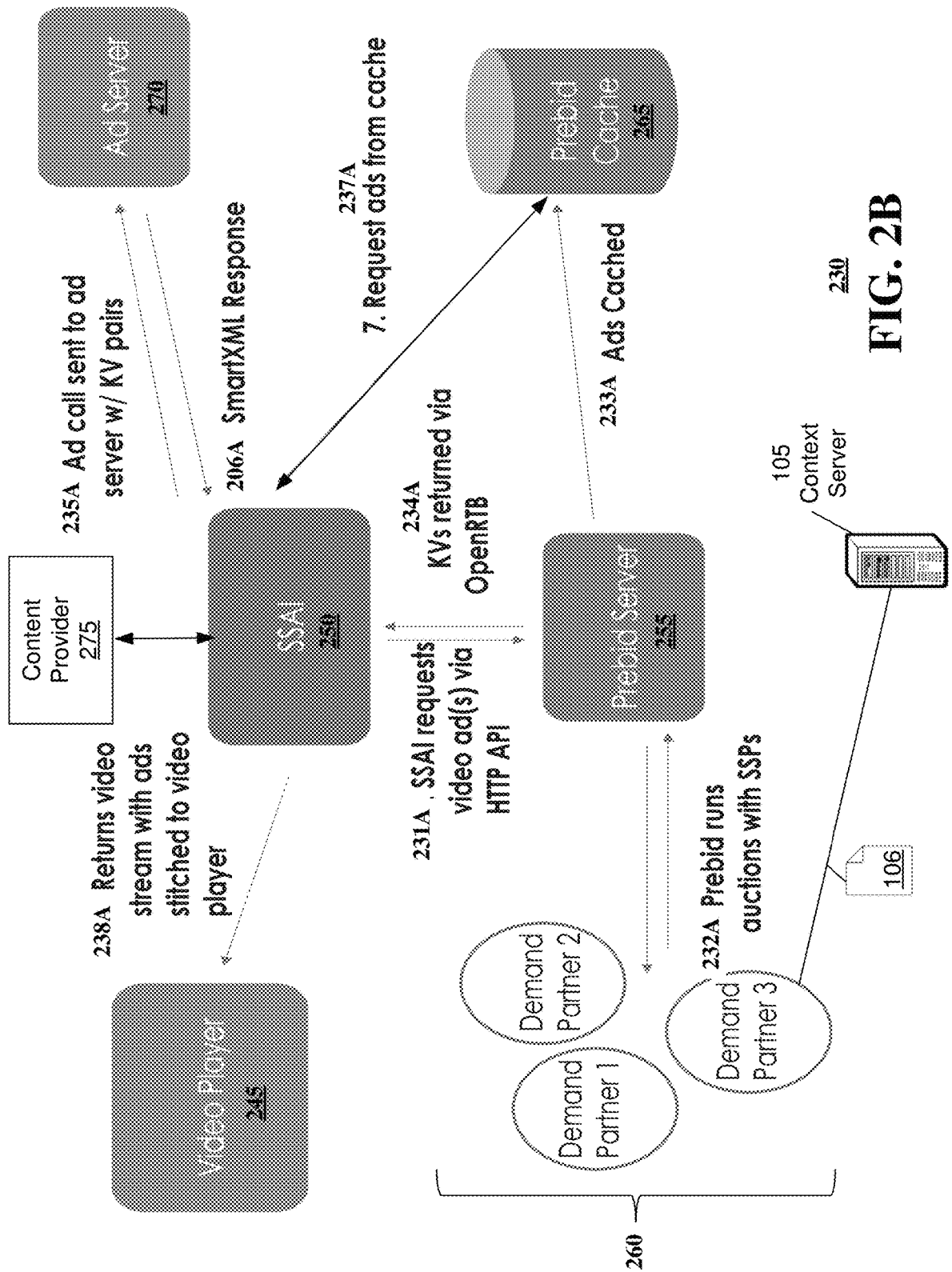
FIG. 2B is a block diagram illustrating an example, non-limiting embodiment of a system functioning within or in conjunction with the communication network of FIG. 1 in accordance with various aspects described herein.

FIG. 2B is a block diagram illustrating an example, non-limiting embodiment of a system 230 that manages advertising insertion including providing prebidding for various types of media services such as OTT video (e.g., scheduled content including sports, news, concerts, movies, TV episodes, and so forth). System 230 enables providing standardized content descriptions or context information so that bidders can make a more-informed decision on purchasing the available ad space. The more-informed decision can include buyers or bidders targeting particular content (e.g., based on genre) and/or buyers or bidders excluding particular content (e.g., based on the genre). System 230 can perform an SSAI implementation. System 230 can function in, or in conjunction with, various communication systems and networks including the communications system 100 of FIG. 1 and the data flow 200 in accordance with various aspects described herein.

System 230 can provide for SSAI in various formats including scheduled content in an OTT media service. System 230 includes an SSAI server 250 that can deliver media services to an end user device, which in this example is shown as a video player 245. The system 230 also includes a prebid server 255 that communicates with equipment 260 of one or more SSPs or demand partners, such as advertising networks or exchanges. Prebid server 255 enables publishers to have auctions (e.g., simultaneously or overlapping in time) with all or selected SSPs (including ad exchanges) 260. In this manner, publishers can receive bids on inventory that may be unavailable through a primary ad server and exchange. The returned bids or a portion thereof can then be provided to an ad server 270 to compete with direct demand and the primary ad server's exchange. In one or more embodiments, the prebid auctions can be performed in a particular time frame such as within a few hundred milliseconds (e.g. less than 100 or 200 milliseconds), although, other time frames can be utilized by the exemplary embodiments.

In this example, the SSAI server 250 can determine that a video stream is being requested by the video player 245, such as receiving a request from the video player. The SSAI server 250 can send at 231A a request associated with the video to the prebid server 255. The request can include information that also enables selecting corresponding context information 106 for the content, such as a channel indicia and a time indicia which can be utilized to look up the corresponding context information supplied by a context server 105 (e.g., an EPG service) for the scheduled content. The context information 106 can be provided as a batch covering all content over a particular time period and stored locally or can be provided on a case-by-case basis.

In one embodiment, a HyperText Transfer Protocol (HTTP) Application Programming Interface (API) can be utilized for the request. However, various techniques can be utilized to notify the prebid server 255 to initiate a prebid auction. In one embodiment, the request sent to the prebid server 255 can specify ad pod requirements for the video stream, such as the number of creatives that are being sought. In one or more embodiments, the SSAI server 250 can selectively initiate the prebid auction via the prebid server 255 according to the particular video being requested.

At 232A, the prebid server 255 can conduct or otherwise perform the prebid auctions for obtaining bids and determining candidate bids. For example, the prebid server 255 can send a request for bids to selected demand partners 260 (e.g., competing SSPs/ad exchanges). This can be done in a number of ways including by relaying OpenRTB requests to the SSPs 260. In one embodiment, the bid requests sent to one, some or all of the SSPs 260 can include context data that is derived from the context information 106. For example, one of the SSPs may provide the context data to its bidders while another of the SSPs does not have access to the context information 106 and/or does not provide the context data to its bidders. In another embodiment, all of SSPs can have access to the context information 106 from the context server 105 and can provide the context data to its bidders. In yet another embodiment, the prebid server 255 can manage collection of the context information 106 from the context server 105 and can selectively provide the context information to one, some or all of the SSPs so that one, some or all of the SSPs can selectively provide the context data to its bidders. The use of context information 106 is illustrated as being part of the prebid auction, however, this information can be utilized to facilitate buyer or bidder decisions in other situations, such as auctions conducted by the ad server 270.

In one embodiment, the demand partners or SSPs 260 can return bid responses to the prebid server 255. Candidate bids can then be selected by the prebid server 255 from among the received bids, such as the highest bids overall or the highest bid(s) from each category. The process of determining the candidate bids can be controlled by the publisher such as: selecting the highest bids regardless of category; or selecting the highest bids and excluding duplicate bids from the same category; or selecting a plurality of highest bids from each category, and so forth. In one or more embodiments, a single source can be utilized for clearing bids from multiple SSPs.

The bid responses can include various information including the creative, the price, the category of the creative, the duration of the creative, an identification of the creative or a combination thereof. For instance, a bid response can be transmitted during the prebid auction (e.g., transmitted or received within a particular time period) from one of the SSPs 260 to the prebid server 255 where the response includes the creative, the price, a category of the creative (e.g., a category selected according to the IAB categories), and a duration of the creative. In one embodiment, bid responses that do not include a category for the creative can be discarded or otherwise not deemed to be a candidate bid (even if having the highest price) by the prebid server 255. In another embodiment, for bid responses that do not include a category, the prebid server 255 can attempt to determine a category for the creative of the bid response such as based on an identification of the creative included in the bid response, an analysis or pattern recognition of the creative, or according to other information such as information included with the creative.

In one embodiment at 233A, whether or not category translation is required or performed, the bids and/or the corresponding creatives (or information representative of the creative that allows for access to the creative) can be stored in a prebid cache 265, such as a database accessible to the prebid server 255 and/or accessible to the SSAI server 250. For example, a cache ID can be utilized to facilitate accessing the stored information such as the creative. The particular creative of the bid in the category for a particular user of the video player 245 can be customized according to various factors such as demographics, location, and/or consumption history. In one embodiment, all bids and/or all creatives of the bids that are received can be stored in, or otherwise made accessible via, the prebid cache 265 such as for use for statistical analysis. In another embodiment, only a portion of the bids are stored in the prebid cache 265 such as storing only candidate bids or storing candidate bids along with a portion of the non-candidate bids (e.g., a runner-up bid).

In one or more embodiments, the prebid server 255 can generate key value pairs that are multi-dimensional, such as price, category, and duration values. In one or more embodiments, other dimensions can be included in the key value pairs in order to provide more control and flexibility for bidders and/or publishers. For example, one or more additional dimensions in the key value pairs provided by the prebid server 255 to the SSAI server 250 could be requirements of the bidder (e.g., bidder only wants its creative to be in a mid-roll) which are to be enforced by the ad server 270. In one embodiment, these bidder requirements are included in the bid responses and the prebid server 255 generates key value pairs representative of the bidder requirements. Various bidder requirements can be utilized such as a position in the ad pod; a selection of the ad pod from among a pre-roll, a mid-roll or a post-roll of the video stream; another brand or another category for another creative that must also be in the ad pod; another brand or another category for another creative that must not be in the ad pod; or any combination thereof.

In another embodiment, genre selection can be enabled, such as via a bid requirement. In one or more embodiments, audience targeting and/or contextual (content) targeting can be implemented to provide buyers with more desirable ad space which can improve monetization. For example, information identifying audience targeting parameters (e.g., audience demographics) and/or contextual targeting parameters (identification of genre or Title) can be passed in the bid requests. In one or more embodiments, targeting of particular content and avoiding particular content for ad placement can be performed based on the context information being managed herein.

In one embodiment, the number of dimensions for the key value pairs (derived from the bid responses) can be designated by the publisher and/or the bidder. In another embodiment, the dimensions utilized in the key value pairs can be synchronized with or otherwise compatible with the line items utilized by the ad server 270.

In embodiments where additional dimensions (e.g., in addition to or in place of one or more of price, category and duration) are utilized in the key value pairs, the ad server 270 can be configured (e.g., via an ad server interface for configuring line items or other objects) for reading and recognizing these additional dimensions. In another embodiment, additional requirements could be included in the bid response metadata and the prebid server 255 could filter out bids to obtain the appropriate bids. In one embodiment, requirements of the publisher (e.g., publisher is only seeking bids for a mid-roll) could be processed via a bid filtering performed by the prebid server 255. In one embodiment, the bid responses (or a portion thereof) can include only brand information or a combination of category and brand information, and the prebid server 255 can return to the SSAI server 250: category and brand information; only category information; or only brand information. In one embodiment, the brand information included in the bid response can be utilized by the prebid server 255 to determine the category which can then be translated to a category recognizable by the particular ad server 270 which is included in the returned key value pairs.

The SSAI server 250 can parse the returned key value pairs and at 235A provide them to the ad server 270. For example, the key value pairs can be appended as a query string to the ad server request URL and submitted as an ad call request. However, other techniques and protocols can be utilized for delivering key value information to the ad server 240. In one embodiment, the SSAI server 250 can take the key values and pass them to the ad server 270 as keywords.

At 236A, the ad server 270 returns information representative of the optimized or otherwise determined ad pod. For example, a SmartXML response can be returned to the SSAI server 250. Although, other techniques and protocols can be utilized for delivering the determined ad play list for the ad pod to the SSAI server 250. As part of this process, the ad server 270 determines which creatives are to be provided in the ad pod according to the application of business rules. This process can include the ad server 270 comparing the key value pairs to line items in order to find a matching line item, as well as comparing to other line items that bid on the impression and can include determining winning bids from among prebidders, direct bidders and guaranteed buys according to the business rules. In one or more embodiments, the ad server 270 can target any bid where the bid duration matches that of the line item.

The providing of the key value information by the SSAI server 250 to the ad server 270 enables the ad server to determine the ad play list for the ad pod of the video stream according to the business rules. As an example, the business rules can include a yield policy that is enforced based on the price (e.g., highest price) for each of the candidate bid responses. The yield policy can be based on increasing or maximizing revenue from advertising for a publisher of the video stream. The business rules can include a competitive separation policy that is enforced based on the category for each of the candidate bid responses. For example, the ad server 270 can prevent creatives from a same industry (e.g., a same category) appearing in a same ad pod or appearing next to each other in the ad pod. In one embodiment, application of the yield policy can result in a bid being selected which may not be the highest bid but results in a higher yield for the particular ad pod of for the particular video content. As an example, a lower price creative may be selected over a higher price creative for an ad pod because the lower price creative does not prevent other higher price creatives from being included in the ad pod (e.g., according to the competitive separation policy, a brand safety policy, or a bidder requirement) and results in this example in an overall higher overall yield. In another example, a lower price creative may be selected over a higher price creative for an ad pod based on frequency capping rules because the lower price creative can appear more often in the long form video and results in this example in an overall higher yield than selecting the higher price creative which may be limited to being presented one time. In this example, the frequency capping can be enforced based on line item data and/or key value information derived from the bid responses.

In one embodiment at 237A, the SSAI server 250 can request and obtain creatives from some or all of the prebid cache 265. For example, the creatives from the prebid cache 265 for any winning prebids can be retrieved from the prebid cache 265 which are to be stitched into the ad pod of the content delivered to the end user device. In one embodiment, the ad server 270 can provide the creatives for any non-prebid winners (e.g., direct bid winners or guaranteed buys) to the SSAI server 250. In this example, the ad pod can include prebid winner creatives and non-prebid creatives which can be obtained from different sources.

In one embodiment, the SSAI server 250 can request the content (e.g., movie, episode of a show, other long form video) from a content host or provider or other content source 275 and can stitch the creatives and content together. At 238A, the stitched video stream can be returned to the video player 245 of the end user device for rendering the OTT service. System 230 can increase or optimize effective cost per mille (eCPM). Using a prebid-architecture enables publishers to increase or maximize CPMs by allowing bidders to compete for the publisher's audience (which can optionally compete against direct sold creatives).

In one or more embodiments, a VAST Extensible Markup Language (XML) is cached (e.g., in a prebid cache) such as to account for video players that only work with a URL that returns VAST XML, not VAST directly. In some embodiments, the VAST XML can be cached on the server-side and/or a prebid script can perform the caching. For example, the bid responses can include a bid.videoCacheKey, a bid.vastXml, a bid.vastUrl or any combination thereof. In one embodiment, the VAST XML for winning bids, a portion of all of the bids, or all of the bids can be stored in the prebid cache without storing the actual video ad. In one or more embodiments, system 230 enables control over how frequently a placement will appear within a campaign, which can include various frequencies such as allowing a repeat in a commercial break, not allowing a repeat, or a default setting.

In one embodiment, a level of exclusivity can be provided or configured to determine the range of ads that fall within the competitive separation rules. The level can be of various types including no exclusivity, no other industry ad appearing in the same ad pod, a custom exclusivity configuration, and so forth. In one embodiment, a scope of exclusivity can be provided or configured to determine on what ad types the competitive separation will occur. The scope can be of various types including any ad, targeted ads, ads appearing adjacent to the creatives, and so forth.

In one or more embodiments, an interface is provided to enter an identifier for a line item and line item data which can control when an ad will display and for how long, at the CPM or other pricing model, the size of the creative, and so forth. The interface can enable inputting accompanying creatives and additional targeting to be specified. The interface can provide for inputting labels such as industry identifiers that enable preventing ads in the same industry group from appearing either within or adjacent to each other in the ad pod. In one embodiment, labels entered in a line item are only applied to that line item. In one or more embodiments, the interface is accessible (e.g., by a publisher) for configuring the ad server 270 or line items used by the ad server In one embodiment, a maximum duration of the video creative can be entered into the interface. This value can be used for forecasting purposes. In one embodiment, information regarding the campaign, including start and end times, the desired rate, currency, revenue type, and so forth can be entered via the interface. In one embodiment, other information can be entered such as quantity (e.g., number of impressions, clicks or viewable impressions); rate (e.g., amount for either CPM or CPA); and/or discount (e.g., amount the line item cost will be reduced which may not affect a priority of the line item).

In one embodiment, targeting information can be entered via the interface which enables setting values to focus the targeting of the publisher's ad space to certain types of ads or audiences. In one embodiment, video position can be entered via the interface which enables the placement of the creative within the video, such as pre-roll for the beginning of a video or post-roll for the end. In one embodiment, inventory information can be entered via the interface which enables selecting which inventory to include. In one embodiment, key-values and/or audience information can be entered via the interface which enables the selection of an audience segment and age to target for the ad unit and/or allows for the inclusion of custom keywords. In one embodiment, geography information can be entered via the interface which enables specifying a geographic location where the creative will display. In one embodiment, device information can be entered via the interface which enables specifying settings for targeting browser, browser language, device, and operating system. In one embodiment, connection information can be entered via the interface which enables specifying settings for targeting bandwidth, mobile carriers and domains.

In one or more embodiments, line items can have an inventory size selection which dictates whether creatives are attached or not, such as standard or master/roadblock selections having creatives attached directly to them, while video VAST selections do not have creatives. For example, video VAST selections can have creative sets associated with them where each creative set contains a URL that points to cached VAST XML.

Figure 2C:
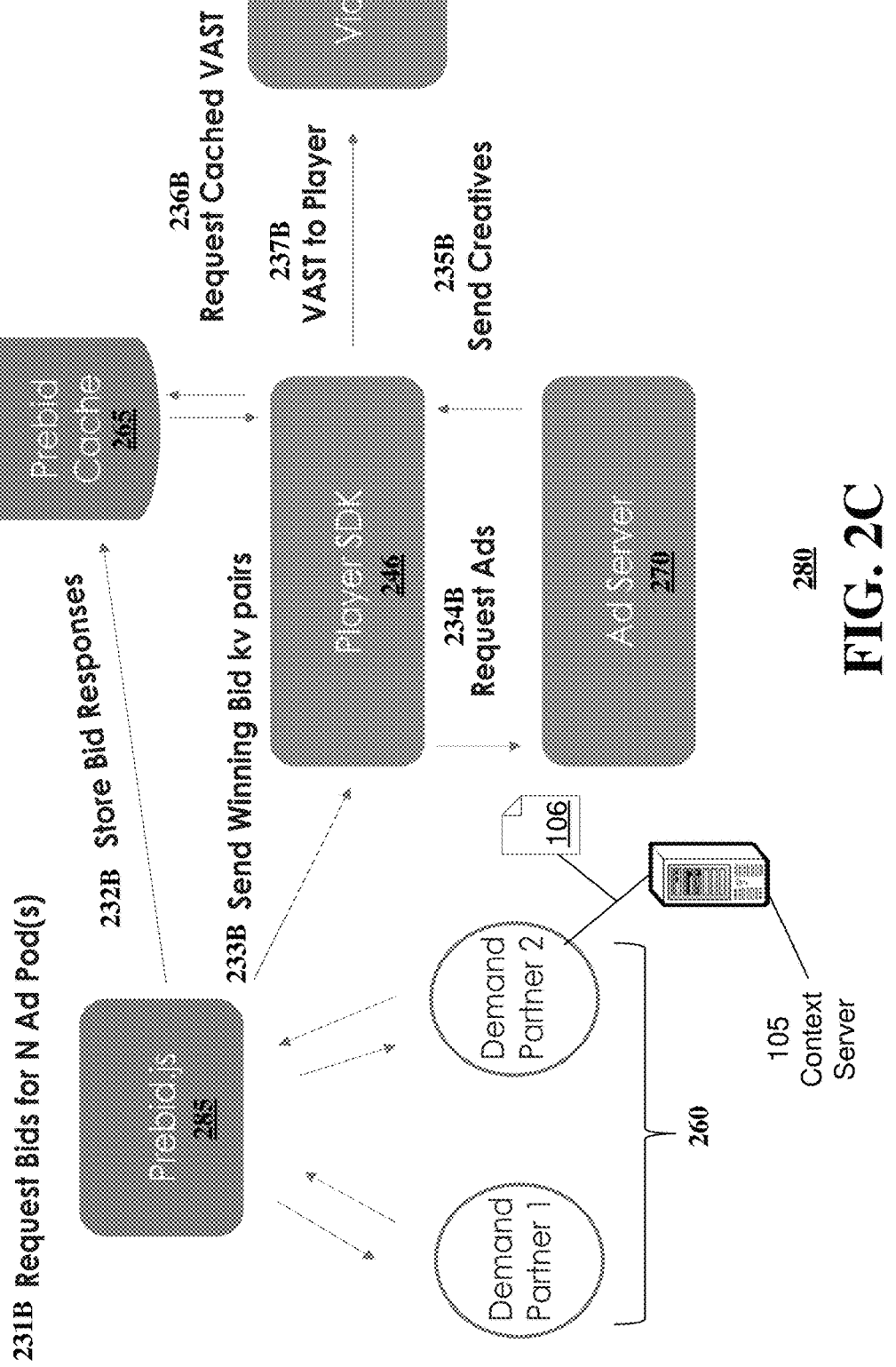
FIG. 2C is a block diagram illustrating an example, non-limiting embodiment of a system functioning within or in conjunction with the communication network of FIG. 1 in accordance with various aspects described herein.

FIG. 2C is a block diagram illustrating an example, non-limiting embodiment of a system 280 that manages advertising including providing prebidding for various types of media services such as OTT video (e.g., scheduled content including sports, news, concerts, movies, TV episodes, and so forth). System 280 can perform a CSAI implementation using prebid code or script 285 (e.g. a javascript). System 280 can function in, or in conjunction with, various communication systems and networks including the communications network 100 of FIG. 1 in accordance with various aspects described herein.

At 231B, the prebid script 285 can conduct or otherwise perform the prebid auctions for obtaining bids and determining candidate bids. For example, the prebid script 285 can send requests for bids to selected demand partners 260 (e.g., competing SSPs/ad exchanges). The demand partners or SSPs 260 can return bid responses to the prebid script 285. As an example, each bid response can include the bid price and a video creative (e.g., in the form of a VAST tag URL which returns a VAST XML wrapper). For instance, if the bid is selected by the ad server 270 then this video creative can be rendered by the video player 245.

In one or more embodiments, the bid requests can include information that also enables selecting corresponding context information 106 for the content, such as a channel indicia and a time indicia which can be utilized to look up the corresponding context information supplied by a context server 105 (e.g., an EPG service) for the scheduled content. The context information 106 can be provided as a batch covering all content over a particular time period and stored locally or can be provided on a case-by-case basis. The use of context information 106 is illustrated as being part of the prebid auction, however, this information can be utilized to facilitate buyer or bidder decisions in other situations, such as auctions conducted by the ad server 270. In one or more embodiments, the context information 106 can allow buyers or bidders to target and/or avoid ad placement with respect to a particular show, genre and so forth, such as through use of one or more targeting criteria of a line item or exchange curated deal and/or through use of one or more exclusion criteria of a line item or exchange curated deal.

In one embodiment at 232B, each video bid (or candidate bids) can be stored in the prebid cache 265 where mapping IDs are generated and provided to the ad server 270. Candidate bids can then be selected by the prebid script 285 from among the received bids, such as the highest bids overall or the highest bid(s) from each category. The process of determining the candidate bids can be controlled by the publisher such as: selecting the highest bids regardless of category; or selecting the highest bids and excluding duplicate bids from the same category; or selecting a plurality of highest bids from each category, and so forth.

At 233B, the prebid script 285 can send (e.g., via the player SDK 246) key value pairs associated with the candidate bids. For example, the prebid script 285 can generate a master video ad server tag URL from an existing video ad server tag and from identified key value targeting pairs based on information included in the bid responses (e.g., price, category, duration). At 234B, the player SDK 246 can send an ad request to the ad server 270. For instance, the player SDK 246 can load the master video ad server tag URL, which causes a call to the ad server 270.

The ad server 270 can then apply business rules including a revenue yield policy to determine winning bids from among the prebids which can be considered alone or can be considered in conjunction with direct bids and/or guaranteed buys that are managed by the ad server 270. Other business rules can also be applied, including a competitive separation policy. The application of the business rules can be done through matching of key value pairs with pre-configured line items. At 235B, creatives included in the determined ad play list (e.g., for the ad pod) can be sent to the player SDK 246, such as for creatives that are not prebidder creatives but rather direct bids or guaranteed buys. At 236B, a request for cached VASTs can be made (e.g., for each of the prebid creatives that are included in the ad pod).

In one embodiment, the master video ad server tag URL can be utilized for returning VAST XML wrappers containing the creatives or a portion thereof for the ad pod. At 237B, the creatives can be rendered in the ad pod, such as the VAST tag URL being rendered by the video player 245.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 200, 230, 280, data flow 200, and method 700 presented in FIGS. 1, 2A, 2B, 2C, and 7. For example, virtualized communication network 300 can facilitate in whole or in part providing ad insertion in OTT live media services including scheduled content where context information such as EPG data is provider to bidders to facilitate bidding during an auction such as a prebid auction. In other embodiments, various business rules can be implemented including revenue yield and/or competitive separation policies (e.g., enforced by the ad server) according to key value pairs provided by a prebid server and/or a client-side prebid code, where the prebid auctions enable competition between prebids from multiple SSP servers, direct offers or guaranteed buys. The context information can be derived from a context source, such as an EPG service, that describes scheduled content. Agreements as to the granularity or level of detail of the context information can be enforced by analyzing the agreements and filtering the context data that is provided to bidders during the auction.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
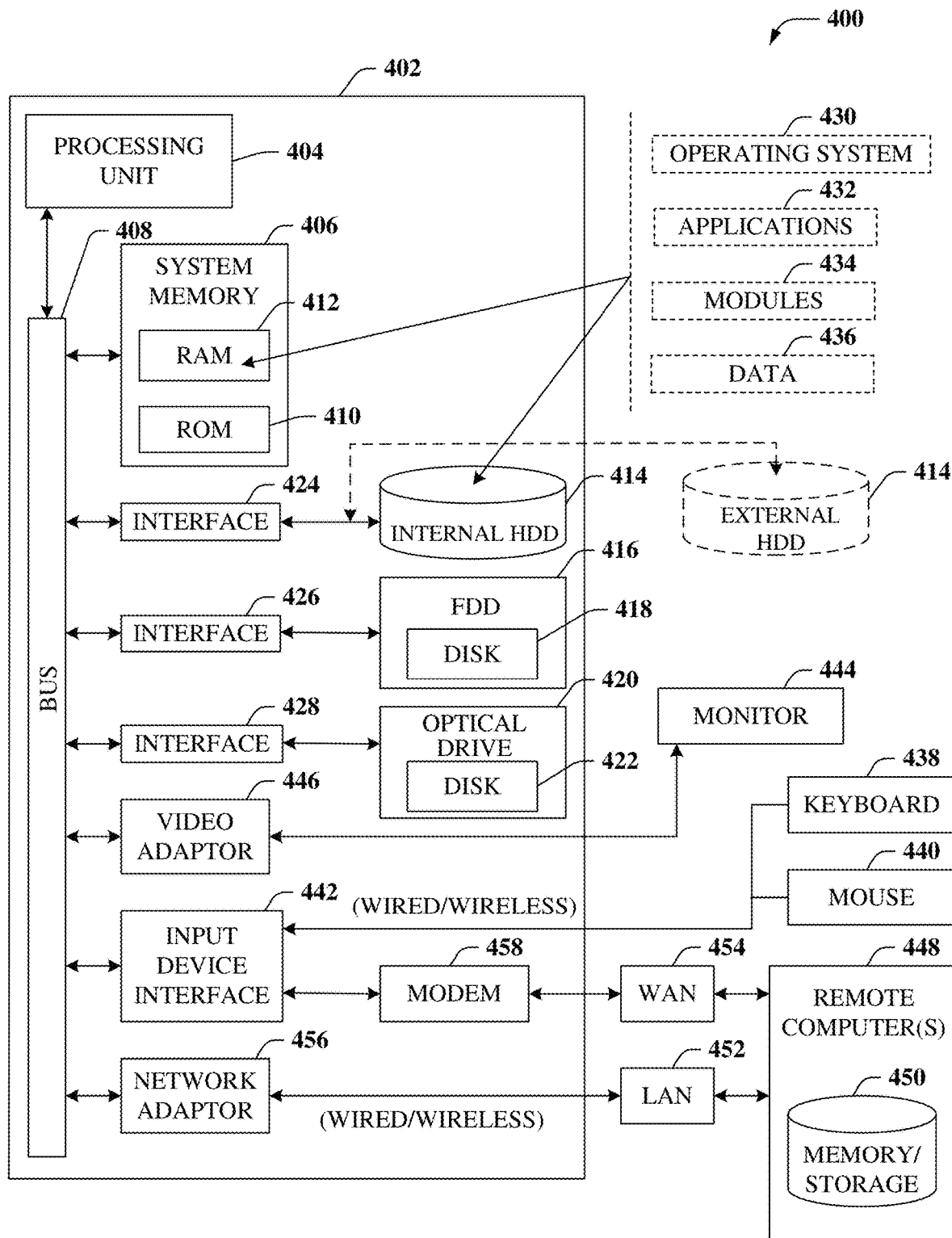
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part providing ad insertion in OTT live media services including scheduled content where context information such as EPG data is provider to bidders to facilitate bidding during an auction such as a prebid auction. In other embodiments, various business rules can be implemented including revenue yield and/or competitive separation policies (e.g., enforced by the ad server) according to key value pairs provided by a prebid server and/or a client-side prebid code, where the prebid auctions enable competition between prebids from multiple SSP servers, direct offers or guaranteed buys. The context information can be derived from a context source, such as an EPG service, that describes scheduled content. Agreements as to the granularity or level of detail of the context information can be enforced by analyzing the agreements and filtering the context data that is provided to bidders during the auction.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
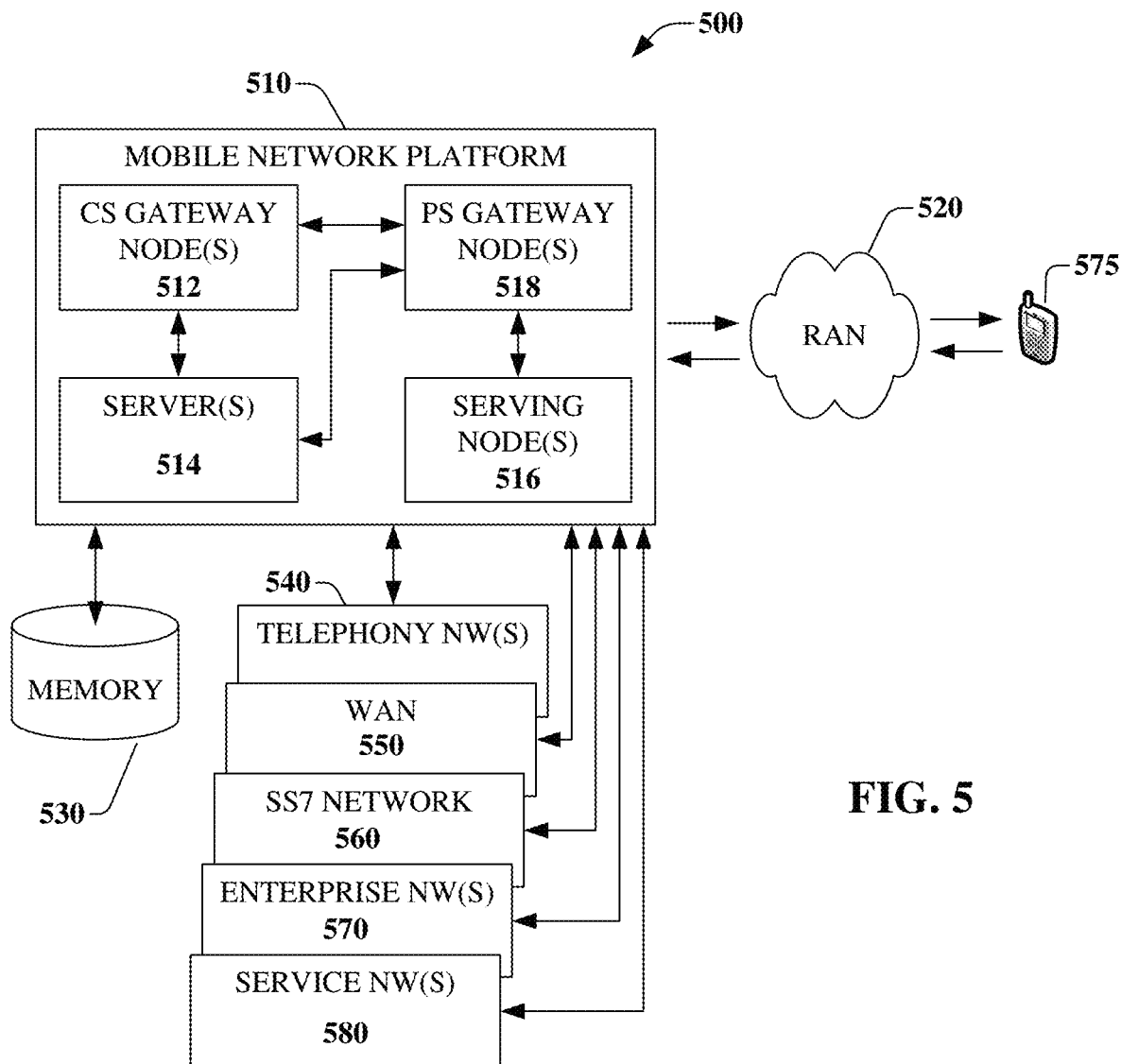
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part providing ad insertion in OTT live media services including scheduled content where context information such as EPG data is provider to bidders to facilitate bidding during an auction such as a prebid auction. In other embodiments, various business rules can be implemented including revenue yield and/or competitive separation policies (e.g., enforced by the ad server) according to key value pairs provided by a prebid server and/or a client-side prebid code, where the prebid auctions enable competition between prebids from multiple SSP servers, direct offers or guaranteed buys. The context information can be derived from a context source, such as an EPG service, that describes scheduled content. Agreements as to the granularity or level of detail of the context information can be enforced by analyzing the agreements and filtering the context data that is provided to bidders during the auction.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
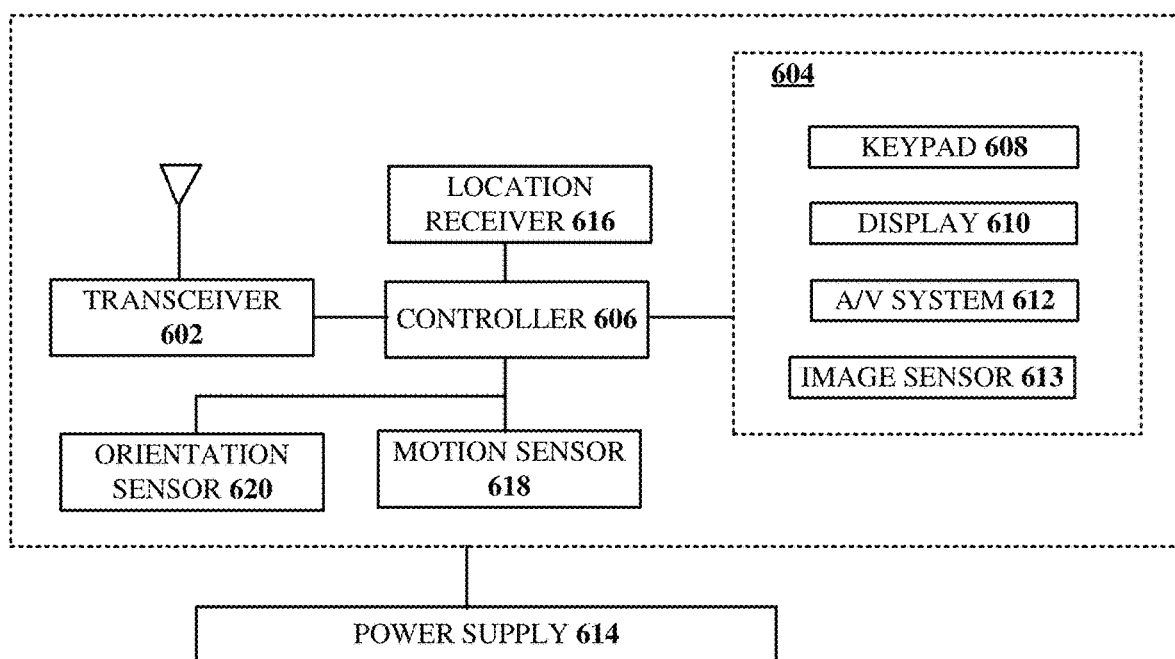
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part providing ad insertion in OTT live media services including scheduled content where context information such as EPG data is provider to bidders to facilitate bidding during an auction such as a prebid auction. In other embodiments, various business rules can be implemented including revenue yield and/or competitive separation policies (e.g., enforced by the ad server) according to key value pairs provided by a prebid server and/or a client-side prebid code, where the prebid auctions enable competition between prebids from multiple SSP servers, direct offers or guaranteed buys. The context information can be derived from a context source, such as an EPG service, that describes scheduled content. Agreements as to the granularity or level of detail of the context information can be enforced by analyzing the agreements and filtering the context data that is provided to bidders during the auction.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

Figure 7:
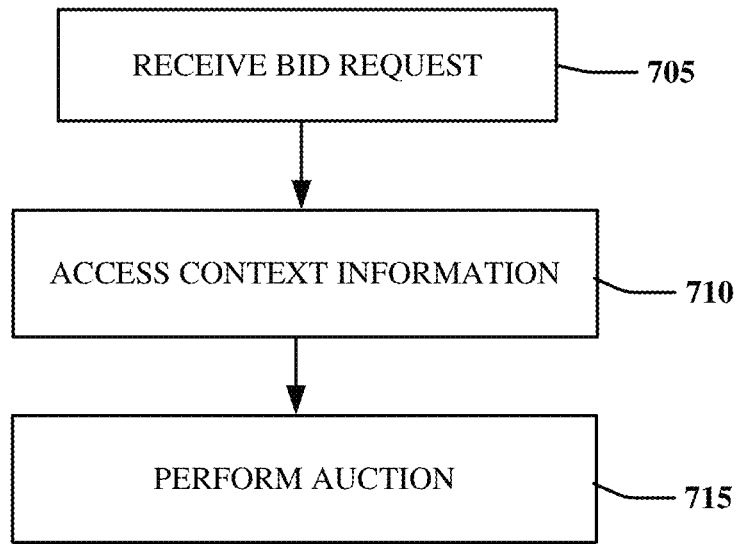
FIG. 7 depicts an illustrative embodiment of a method in accordance with various aspects described herein.

FIG. 7 depicts an illustrative embodiment of a method 700 in accordance with various aspects described herein. At 705, a processing system (including a processor) can receive a bid request that indicates a television channel associated with a video stream requested by an end user device and that includes information related to an ad space or an ad pod of the video stream. For example, the video stream can be an OTT live streaming service that provides scheduled content. At 710, the processing system can access context information according to the television channel and according to a time associated with the ad pod. As an example, the context information can describe the video stream (e.g., a summary of the subject matter, genre, duration, rating, and so forth) and can be generated by a context server. In one embodiment, the context information can be EPG data.

At 715, the processing system can perform an auction to obtain bid responses. In one embodiment, the auction can be a prebid auction (e.g., hosted by one or more SSP servers) where the auction provides bidders with context data that is representative of at least a portion (e.g., some or all) of the context information. In one or more embodiments, the context information can allow buyers or bidders to target and/or avoid ad placement with respect to a particular show, genre and so forth, such as through use of one or more targeting criteria of a line item or exchange curated deal and/or through use of one or more exclusion criteria of a line item or exchange curated deal. Each of the bid responses can include a price. Candidate bid responses can be selected from among the bid responses according to the price of each of the bid responses, where the selecting the candidate bid responses enables selection of a creative for the ad space or a determination of an ad play list for the ad pod of the video stream. The selection of the creative or ad play list can be done according to business rules. For example, the business rules can include a yield policy that is enforced based on the price for each of the candidate bid responses, where the yield policy is based on increasing revenue for a publisher of the video stream.

In one or more embodiments, the processing system is part of a real-time bidding advertising exchange, and the auction is a prebid auction. In one or more embodiments, the selection of the creative or the determination of the ad play list is by an ad server based in part on a second prebid auction(s) performed by an SSP server(s) to obtain other bid responses, where the second prebid auction(s) do not provide the other bidders with the context information, and where the SSP server(s) are operated by a first entity(ies) that is/are distinct from a second entity operating the processing system.

In one or more embodiments, the selection of the creative or the determination of the ad play list is by an ad server based in part on a second prebid auction(s) performed by an SSP server(s) to obtain other bid responses, where the second prebid auction(s) do not provide the other bidders with the context information, where the SSP server(s) are operated by a first entity that is distinct from a second entity(ies) operating the processing system. In this example, the context information can include EPG Data, where the context server is operated by a third entity that is distinct from the first entity and the second entity(ies).

In one or more embodiments, the accessing the context information can also include the processing system periodically retrieving the context information from the context server and storing the context information (e.g., in a local storage device).

In one or more embodiments, the method can include accessing, by the processing system, a filtering agreement associated with a distributor of the television channel; analyzing, by the processing system, the filtering agreement to determine filtering criteria; and generating, by the processing system, the context data by applying the filtering criteria to the context information sourced by the context server.

In one or more embodiments, the selection of the ad space or the determination of the ad play list is by an ad server based on the yield policy applied to one or more direct offers obtained by the ad server. In one or more embodiments, the context information can include EPG Data.

In one or more embodiments, reporting can be delivered (e.g., via the auction server 104, the Ad Delivery and Decision Making System 204, or some other device(s)) that describes the serving of ads, including ads served via the OTT live streaming service. For example, buyers, sellers, and/or brokers can be provided with performance data that indicates the inventory being served on particular content, including identifying particular content and/or indicating types of content such as sports, concerts, highly viewed content vs not highly viewed content, and so forth.

In one or more embodiments, the systems described herein (e.g., the auction server 104, the Ad Delivery and Decision Making System 204, or some other device(s)) provide buyers and bidders with the ability to access and target live inventory based on content metadata such as "genre" and "rating", which in some examples can facilitate capturing a full value of seller deals and/or curated deals.

In one or more embodiments, the passing of context data to particular buyers and bidders (e.g., context data derived from context information 106) will enable one or more of the SSP servers 260 to transact and report on standardized granular content metadata including via curated deals targeting live inventory. In one or more embodiments, one or more of the SSP servers 260 will not have access to the context data and will not be passing the context data to particular buyers and bidders.

In one or more embodiments, the context data passed to the buyers and bidders (including in auctions, deals, curated deals, etc.) can include one or more of content duration, content delivery type (e.g., VOD or live), content genre, program type (e.g., show, episode, sports, movie, etc.), content rating, and other descriptive information including subject matter descriptions, entity descriptions (e.g., teams, actors or actresses, and so forth). In one or more embodiments, the context data can also be included in reporting to sellers, buyers and/or brokers.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one embodiment, the ad server can transmit, over the network to the SSAI server, ad play list information representative of the ad play list for the ad pod of the video stream, where the transmitting of the ad play list information enables the SSAI server to stitch content (e.g., obtained from a content source) of the video stream with creatives from the ad play list into the ad pod resulting in stitched content that is provided to the end user device to be rendered.

In one embodiment, candidate bid responses can be received by a prebid script (e.g., operating on an end user device) over a network within a time deadline during prebid auctions, from one or more SSP servers, where each of the candidate bid responses identify a creative and include a price and a category of the creative. In one embodiment, the candidate bid responses can be stored by the prebid script in a prebid cache server, where the candidate bid responses are mapped to corresponding unique cache identifications. In one embodiment, key value pairs can be transmitted from the prebid script to an ad server. For example, an ad server tag URL can be generated by the prebid script based on combining an existing video ad server tag with key value pairs obtained from the candidate bid responses, where the key value pairs are representative of the price and duration of each of the candidate bid responses. The ad server tag URL can then be utilized for transmitting over the network to the ad server, a request for an ad play list to populate an ad pod of the video stream. The transmitting of the request can enable the ad server to determine the ad play list according to pre-configured line items and business rules such as a yield policy and/or a competitive separation policy, which can be applied to prebids, direct bids and guaranteed buys. The yield policy can be enforced by the ad server based on the price for each of the candidate bid responses, where the yield policy is based on increasing revenue for a publisher of the video stream. In another embodiment, the competitive separation policy can be enforced by the ad server based on the category for each of the candidate bid responses.

In one or more embodiments, publishers can allocate portions of their ad space inventory to buyers (e.g., advertisers or ad networks) for the buyers' ad campaigns ("direct" ad campaigns or "programmatic" ad campaigns) through offline agreements. The terms of such agreements can include the payment model and pricing for the ad space inventory, the desired pacing of the ad campaign (e.g., the time rate at which the publisher's ad spaces are allocated to the ad campaign), targeting parameters (e.g., preferences or limits on which instances of ad space inventory can be allocated to an ad campaign, based on data associated with the ad space inventory), priority of the ad campaign relative to cotemporaneous ad campaigns on the publisher's site, and so forth. In one or more embodiments, these agreements can be implemented and enforced by an allocation management module associated with (e.g., executing on) the publisher's ad server. To implement and enforce the terms of such agreements, the allocation management module can use line items and business/prioritization rules. For example, when a request to fill an available ad space is received, the allocation management module can compare characteristics of the ad space to the parameters of line items representing the publisher's agreements with buyers. If more than one line item matches the ad request (indicating that more than one creative or ad campaign may be eligible to fill the ad space), the allocation management module applies the business/prioritization rules (e.g., revenue yield policy and/or competitive separation policy) to determine which ad campaign or creative fills the ad space which can be multiple ad spaces in an ad pod of OTT content being delivered to an end user device.

In one or more embodiments, line items facilitate allocating ad space inventory among buyers in ways that are consistent with the terms of agreements between a seller and the buyers, including targeting, pacing, prioritization, number of impressions, and budget constraints. In one or more embodiments, values of parameters of line items can be set (e.g., via input or by programmers) prior to initiating the ad campaign, although adjustments during the ad campaign could also be made.

In one or more embodiments, prebidding and/or direct bidding can be enabled for real-time bidders via server-side and/or client-side auctions. The prebidding and/or direct bidding can be performed on some or all of the ad inventory being sold, including some or all of the ad pods of OTT content. The direct bidding can be performed by an auction managed by an ad exchange associated with the publisher. The prebid auction can be managed by a prebid server (SSAI) or prebid script of the client device (CSAI) using simultaneous or overlapping auctions with SSPs or demand partners. In one or more embodiments, the prebid auctions (e.g., client-side and/or server-side using a prebid server) take place prior to allocating ad space inventory to the ad campaigns of the publishers' direct or programmatic partners (e.g., direct bids or guaranteed buys).

Auction data describing the results of the prebid auction (e.g., the identity of winning bidder(s), bid price, creative, category of the creative and/or bidder requirement(s)) are then provided to the allocation management module, which uses the auction data to determine how to allocate the ad space according to business rules that include a revenue yield policy to increase revenue and a competitive separation policy. In one embodiment, the allocation management module can allocate sufficient ad inventory to direct and programmatic partners to satisfy minimum placement terms of agreements, even in cases where doing so allows such partners to purchase ad spaces at prices below the prebid prices.

In one or more embodiments, the prebidding can utilize line items to integrate the results of the prebid auction into the allocation management module's process for allocating ad space inventory. A collection of line items can be generated and stored for each potential participant in the prebid auctions. In one embodiment, the line items for a prebidding partner can include various parameters associated with an ad campaign. For example, when a bid for an ad space is received from a prebid partner, the allocation management module can search for a line item with a "buyer identity" parameter that matches the identity of the prebid partner and/or other line item parameters (e.g., duration) that matches the value of the prebid. The allocation management module then determines whether to allocate the ad space. This determination can be made by applying the allocation management module's business/prioritization rules to the prebid line items that match the prebid(s) and the ad campaign line items that match the ad request (e.g., based on revenue yield policy and/or competitive separation).

In one or more embodiments, price buckets can be utilized in line items where the price bucket represents a range of potential bids. In one embodiment, the line item is matched based on the range of the price bucket value, but the bid price is applied. In one embodiment, the prebid price becomes the price bucket value, such as a bid of $1.98 falling into a price bucket of $2.00 (which covers $1.95-$2.05).

Functions described herein, such as performed by the prebid server or the ad server can be performed by modules (e.g., hardware components, software components, databases, etc.) that can be deployed at one or more data centers in one or more geographic locations, for example. The systems described herein can also include one or more modules for load balancing tools and/or security tools. The load balancing tools can manage traffic within a single data center or between multiple data centers. The security tools can manage data protection and access privilege for tenants served by data centers. The modules can comprise components that can execute on the same or on different individual data processing apparatus. Databases or Cache described herein can reside in one or more physical storage systems.

In one or more embodiments, an allocation manager can allocate portions of a seller's ad space inventory to buyers. A buyer can be an advertiser (e.g., an auto manufacturer, a sportswear company), an ad network, an ad exchange, or an advertising agency, for example. Other buyers are possible. A seller can be a publisher (e.g., a content streaming service, a content distribution company), an online gaming service, an ad exchange, or an ad network. Other sellers are possible.

In one or more embodiments, the allocation manager can allocate the ad space inventory such as in an ad pod of an OTT live streaming service to buyers (e.g., based on agreements between buyers and the seller of the ad space inventory, based on the results of auctions, etc.), send relevant information to advertisers, return creatives to the browsers or other applications, keep track of billing and usage for advertisers and publishers, and/or enforce frequency capping, brand safety, quality standards, and so forth.

In one or more embodiments, a seller can negotiate with a buyer and reach an agreement on pricing or other terms for running an ad campaign on ad space inventory available from the seller. The seller or the buyer can create (e.g., through an API or a web page) one or more line items (e.g., implemented as data objects) representing the terms of the agreement and store the line items in a line item data database accessible to the ad server. Such line items can be referred to as ad campaign line items.

Alternatively or in addition, a prospective buyer can use prebidding techniques to place bids on an instance of ad space (e.g., during a client-side and/or server-side auction that can take place before rendering the OTT service). The seller or bidders can create (e.g., through an API or a web page) one or more line items (e.g., implemented as data objects) representing the bidders' prebids.

A line item's parameters can include, without limitation, an identifier of a seller, an identifier of a buyer, identifiers of one or more ad spaces from the seller's ad space inventory, ad tags of one or creatives from the buyer's ad campaign, a category of the creative(s), bidder requirement(s) and/or a price/price bucket for filling an instance of an ad space with a creative from the buyer's ad campaign. For ad campaign line items, the value of the price parameter can be a static price based on the terms of the agreement between the buyer and seller. For prebid line items, the value of the price parameter can be dynamic, and can be determined based on the buyer's prebid. A line item can also include flight dates (start and ending dates for the ad campaign) and one or more user target segments.

In one or more embodiments, the allocation manager can use the line items to allocate the ad space inventory among ad campaigns and prebidders. When the allocation manager receives a request to fill an instance of an ad space, the allocation manager compares data associated with the instance of the ad space to the parameters of the line items in the line item data database.

In one or more embodiments, the POP method or portions thereof described herein can be used with or without an ad server, such as in OTT media services. For example in one embodiment, only programmatic demand is provided by a POP method, without any competition with direct demand from an ad server. Yield optimization can be implemented in this example, and in another embodiment competitive separation can be enforced, such as by a prebid server on its own. For example in one embodiment, a Video Multiple Ad Playlist (VMAP) (e.g., in XML format) can be returned from a POP call directly, and an application calling POP, could use a simple tag only.

In one or more embodiments, prefetching can be implemented. In one or more embodiments, the methods described herein or portions thereof (including the POP techniques) can be implemented in conjunction with prefetching of creatives or ads, such as in advance of usage in a stream, for example during a prior ad break to the current ad break (e.g., many seconds before). Various prefetch techniques and timing can be utilized, such as prefetching between 500 milliseconds to 15 minutes in advance of the usage, and/or fetching 1 to N ad pods/breaks in advance.

In one or more embodiments, audience targeting can be implemented. For example in one embodiment, audience targeting parameters can flow throughout the POP process. In one embodiment, audience targeting parameters can be provided by an SSAI server to a POP proxy (e.g., a prebid server) and then in turn next to an ad server (if being utilized—otherwise the audience targeting parameters can be utilized by the POP proxy determining the ad play list). In another embodiment, audience targeting parameters can be provided for CSAI by the video player which can pass these to the POP proxy (e.g., a prebid script executing via the end user device) and then to the ad server. In one or more embodiments, audience targeting enables the advertising to be made relevant and/or personalized to a user, although one or more embodiments described herein can be implemented without audience targeting.

In one or more embodiments, automated script usage in the ad server can be implemented. For example in one embodiment, a method can be implemented to automatically create all of the necessary line items in the ad server representing the mix of price, creative duration, category and/or any other key value (e.g., a bidder requirement). In this embodiment, this can be achieved in a number of different ways such as via a script, which can run in an ad server (e.g., Freewheel or Google Ad Manager) which makes the process more efficient.

In one or more embodiments, the POP method (or portions thereof) can be executed as directly embedded within a (Real-Time Bidding) RTB-based advertising exchange, rather than using a standalone prebid server. In this example, requests for POP bids can be made as part of a global infrastructure (e.g., thousands of servers) and returned in a high-performance manner. In one or more embodiments, the RTB-based advertising exchange can be of various types. For example in one embodiment, real-time bidding is provided via an open marketplace programmatic auction where ad inventory is sold and bought through a bidding system that occurs in a short time period. In this example, an ad exchange can be utilized which is the platform that connects publishers and advertisers. An RTB auction can be effective for an advertiser because the advertiser can value each opportunity to buy an ad impression in real-time, allowing for accepting or rejecting each ad impression in the campaign. In one or more embodiments, the RTB-based advertising exchange can include components and/or perform functions (e.g., adjusted to work with or in place of one or more components and/or functions in the exemplary embodiments herein) as described in: U.S. Pat. No. 10,262,337 filed Mar. 5, 2010, U.S. Patent Publication 20100268603 filed Mar. 5, 2010, the disclosures of all of which are incorporated herein by reference in their entirety. In one embodiment, a file-based configuration for providing POP parameters can be utilized. In another embodiment, a user interface for providing POP parameters can be utilized. In one embodiment, a combination of a file-based configuration and a user interface for providing POP parameters can be utilized.

In one or more embodiments, the streaming (e.g., OTT streaming) can be of video-on-demand (VOD) or of live streaming, such as scheduled content including live events and programming. In one or more embodiments, requests for ad pods can be up front for an entire program (e.g., for VOD). In one or more embodiments, a request can be a single request such as a "just in time" request (e.g., right before a live programming break). In one or more embodiments, a request can be for several ad pods in advance (e.g., live or VOD streaming).

In one or more embodiments, the prebid server or one or more functions described with respect to the prebid server can be hosted or managed by various entities, such as a publisher or broadcaster, an SSAI provider, an ad exchange provider, or another third party provider.

In one or more embodiments, prioritization can be controlled or adjusted for different types of demand (e.g., POP (such as prebid) demand vs. direct demand). In one embodiment, POP demand can be configured in an ad server to be a lower priority than direct demand in order to ensure that all guaranteed lines in the ad server can be handled. In this example, direct demand will win first and then any extra demand can be filled via programmatic demand obtained via the POP process. In another embodiment, the POP demand (e.g., candidate bids) can compete on a level playing field with direct demand, in which case POP demand can beat direct demand which may be advantageous for monetization. In one embodiment, the POP process can be applied to OTT media service to implement a yield optimization and a competitive separation policy. In one embodiment, the POP process can be applied to OTT media service to implement a yield optimization without applying a competitive separation policy.

In one or more embodiments, the particular categorization techniques that are utilized to facilitate the competitive separation enforcement can vary. In one embodiment, IAB subcategories can be utilized and/or OpenRTB can be utilized as open standards for the POP techniques described herein. In another embodiment, alternate canonical representations can be utilized for categories other than IAB subcategories.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A server, comprising:
a processing system including a processor; and
a memory that stores executable instructions that, when executed by the processing system, facilitate performance of operations, the operations comprising:
receiving a bid request that indicates a television channel associated with a video stream requested by an end user device and that includes ad pod information associated with an ad pod of the video stream;
accessing context information according to the television channel, the context information describing content of the television channel;
accessing a filtering agreement associated with a distributor of the television channel;
analyzing the filtering agreement to determine filtering criteria;
generating context data by applying the filtering criteria to the context information, wherein the context data includes data to be provided to at least one bidder during an auction at a granularity that adheres to the filtering agreement as a result of applying the filtering criteria;
providing the context data to the at least one bidder; and
causing ad insertion to the ad pod of the video stream based upon the result of an auction in which the at least one bidder is a participant.

2. The server of claim 1, wherein the processing system is part of a real-time bidding advertising exchange, and wherein the auction is a prebid auction.

3. The server of claim 1, wherein the operations further comprise performing the auction to receive bid responses that enable a determination of an ad play list for the ad pod of the video stream.

4. The server of claim 3, wherein the determination of the ad play list is by an ad server based in part on a second prebid auction performed by a Supply-Side Platform (SSP) server to obtain other bid responses from other bidders, wherein the second prebid auction does not provide the other bidders with the context data, and wherein the SSP server is operated by a first entity that is distinct from a second entity operating the processing system.

5. The server of claim 4, wherein the context information comprises Electronic Programming Guide (EPG) Data.

6. The server of claim 3, wherein the determination of the ad play list is by an ad server based on a yield policy applied to one or more direct offers obtained by the ad server and wherein the context information comprises Electronic Programming Guide (EPG) Data.

7. The server of claim 1, wherein the context data provided to the at least one bidder enables applying a targeting criterion or an exclusion criterion included in a line item, wherein the accessing the context information further comprises periodically retrieving the context information from a context server and storing the context information.

8. The server of claim 1, wherein the operations further comprise generating a performance report that indicates the context data corresponding to the ad pod in which a creative was served.

9. A non-transitory, machine-readable medium, comprising executable instructions that, when executed by a processing system including a processor, facilitate performance of operations, the operations comprising:
receiving a bid request that indicates a television channel associated with a video stream requested by an end user device and that includes ad pod information associated with an ad pod of the video stream;
accessing context information according to the television channel, the context information describing content of the television channel;
accessing a filtering agreement associated with a distributor of the television channel;

analyzing the filtering agreement to determine filtering criteria;

generating context data by applying the filtering criteria to the context information, wherein the context data includes data to be provided to at least one bidder during an auction at a granularity that adheres to the filtering agreement as a result of applying the filtering criteria;

providing the context data to the at least one bidder, and causing ad insertion to the ad pod of the video stream based upon the result of an auction in which the at least one bidder is a participant.

10. The non-transitory, machine-readable medium of claim 9, wherein the providing the context data to the at least one bidder comprises providing the context data to a plurality of Supply-Side Platform (SSP) servers, and wherein the operations further comprise receiving bid responses from at least one of the plurality of SSP servers.

11. The non-transitory, machine-readable medium of claim 9, wherein the operations further comprise providing key value information to an ad server to enable the ad server to determine an ad play list for the ad pod of the video stream according to business rules.

12. The non-transitory, machine-readable medium of claim 9, wherein the context data provided to the at least one bidder enables applying a targeting criterion or an exclusion criterion included in a line item, wherein the accessing the context information further comprises periodically retrieving the context information from a context server and storing the context information.

13. The non-transitory, machine-readable medium of claim 9, wherein the processing system is part of a real-time bidding advertising exchange, and wherein the auction is a prebid auction.

14. A method, comprising:

receiving, by a processing system including a processor, a bid request that indicates a television channel associated with a video stream requested by an end user device and that includes ad pod information associated with an ad pod of the video stream;

accessing, by the processing system, context information according to the television channel, the context information describing content of the television channel;

accessing, by the processing system, a filtering agreement associated with a distributor of the television channel;

analyzing, by the processing system, the filtering agreement to determine filtering criteria;

generating, by the processing system, context data by applying the filtering criteria to the context information, wherein the context data includes data to be provided to at least one bidder during an auction at a granularity that adheres to the filtering agreement as a result of applying the filtering criteria;

providing, by the processing system, the context data to the at least one bidder; and causing ad insertion to the ad pod of the video stream based upon the result of an auction in which the at least one bidder is a participant.

15. The method of claim 14, wherein the processing system is part of a real-time bidding advertising exchange, and wherein the auction is a prebid auction.

16. The method of claim 15, wherein the context information comprises Electronic Programming Guide (EPG) Data, and wherein the context data provided to the at least one bidder in the prebid auction enables application of a targeting criterion or an exclusion criterion included in a line item.

17. The method of claim 14, further comprising providing key value information to an ad server to enable the ad server to determine an ad play list for the ad pod of the video stream according to business rules.

18. The method of claim 17, wherein the business rules include a yield policy that is enforced based on a price for each of a plurality of candidate bid responses, the yield policy being based on increasing revenue for a publisher of the video stream.

19. The method of claim 14, wherein the receiving the bid request comprises receiving the bid request from a Server-Side Ad Insertion (SSAI) server.

20. The method of claim 19, wherein the providing the context data to the at least one bidder comprises providing the context data to a plurality of Supply-Side Platform (SSP) servers.

* * * * *